(12) United States Patent
Kestenbaum et al.

(10) Patent No.: US 10,803,542 B2
(45) Date of Patent: Oct. 13, 2020

(54) PHYSICAL ASSET RECOGNITION PLATFORM

(71) Applicant: Buildinglink.com LLC, New York, NY (US)

(72) Inventors: Gerald Isaac Kestenbaum, New York, NY (US); Alexander D. Gaudio, New York, NY (US)

(73) Assignee: Buildinglink.com LLC, New York, NY (US)

( * ) Notice: Subject to any disclaimer, the term of this patent is extended or adjusted under 35 U.S.C. 154(b) by 210 days.

(21) Appl. No.: 16/131,910

(22) Filed: Sep. 14, 2018

(65) Prior Publication Data

US 2020/0090295 A1 Mar. 19, 2020

(51) Int. Cl.
| | | |
|---|---|---|
| *G06K 9/00* | (2006.01) | |
| *G06Q 50/28* | (2012.01) | |
| *G06K 7/14* | (2006.01) | |
| *G06K 9/32* | (2006.01) | |
| *G06K 9/72* | (2006.01) | |
| *G06K 9/62* | (2006.01) | |
| G06K 7/10 | (2006.01) | |
| H04N 5/232 | (2006.01) | |
| G06T 7/73 | (2017.01) | |
| G06F 40/205 | (2020.01) | |

(52) U.S. Cl.
CPC .......... *G06Q 50/28* (2013.01); *G06K 7/1413* (2013.01); *G06K 7/1417* (2013.01); *G06K 9/3258* (2013.01); *G06K 9/6215* (2013.01); *G06K 9/72* (2013.01); *G06F 40/205* (2020.01); *G06K 2007/10504* (2013.01); *G06K 2007/10524* (2013.01); *G06K 2209/01* (2013.01); *G06K 2209/25* (2013.01); *G06T 7/74* (2017.01); *G06T 2207/20076* (2013.01); *H04N 5/232* (2013.01)

(58) Field of Classification Search
None
See application file for complete search history.

(56) References Cited

U.S. PATENT DOCUMENTS

| | | | | | |
|---|---|---|---|---|---|
| 6,098,882 | A | * | 8/2000 | Antognini | G06K 1/121 235/454 |
| 6,728,391 | B1 | * | 4/2004 | Wu | B07C 1/00 209/583 |
| 6,829,369 | B2 | * | 12/2004 | Poulin | B07C 3/00 382/101 |
| 7,809,158 | B2 | * | 10/2010 | Carpenter | B65H 7/125 382/101 |

(Continued)

*Primary Examiner* — Hadi Akhavannik
(74) *Attorney, Agent, or Firm* — Fish & Richardson P.C.

(57) ABSTRACT

One or more processors receives one or more first database records indicating a plurality of candidate identifiers are received by one or more processors. The one or more processors obtains one or more electronic images of the physical asset. At least one electronic image includes a graphical representation of data printed on the physical asset. The one or more processors identifies a plurality of regions of the data based on the one or more electronic images. The one or more processors determines a context of the physical asset based on the plurality of regions, selects the identifier from the plurality of candidate identifiers based on the plurality of regions, and generates a second database record including an indication of the context of the physical asset, and an indication of the identifier.

60 Claims, 10 Drawing Sheets

(56) References Cited

U.S. PATENT DOCUMENTS

| | | | | |
|---|---|---|---|---|
| 7,834,289 B2* | 11/2010 | Orbke | ............... | B07C 3/14 |
| | | | | 209/584 |
| 8,336,761 B1* | 12/2012 | McCloskey | ......... | G07G 1/0054 |
| | | | | 235/375 |
| 8,774,455 B2* | 7/2014 | Elmenhurst | ......... | G06K 9/3216 |
| | | | | 382/101 |
| 8,781,159 B2* | 7/2014 | Sones | ............... | G06K 9/00 |
| | | | | 235/440 |
| 8,818,023 B2* | 8/2014 | Carpenter | ......... | G06K 9/00449 |
| | | | | 382/101 |
| 8,829,379 B2* | 9/2014 | Bonnell | ............ | B07C 3/18 |
| | | | | 209/584 |
| 9,106,632 B2* | 8/2015 | Musfeldt | ............ | H04L 9/3234 |
| 9,361,596 B2* | 6/2016 | Ross | ............ | G06Q 10/0633 |
| 9,449,583 B2* | 9/2016 | Lin | ............ | G09G 5/34 |
| 9,589,199 B2* | 3/2017 | Silver | ............ | G06K 7/1413 |
| 9,952,160 B2* | 4/2018 | Frank | ............ | G01N 21/8803 |
| 10,304,348 B2* | 5/2019 | Ekambaram | ......... | G06Q 10/06 |
| 2009/0222354 A1* | 9/2009 | Murphy | ............ | G06K 9/00201 |
| | | | | 705/21 |
| 2014/0351073 A1* | 11/2014 | Murphy | ............ | G01B 11/02 |
| | | | | 705/23 |
| 2015/0142690 A1* | 5/2015 | Sorensen | ............ | G06F 16/11 |
| | | | | 705/330 |
| 2015/0227883 A1* | 8/2015 | Murphy, Jr. | ......... | G06Q 10/083 |
| | | | | 705/330 |
| 2016/0292636 A1* | 10/2016 | Moody | ............ | G06Q 10/083 |
| 2017/0140183 A1* | 5/2017 | Rinehart | ............ | G06Q 10/0833 |

* cited by examiner

PHYSICAL ASSET RECOGNITION PLATFORM

TECHNICAL FIELD

This disclosure relates to electronically determining information regarding a physical asset (e.g., an intended recipient of a package, contextual information regarding a package, etc.) using image processing techniques.

BACKGROUND

Physical assets can be transported from a sender to a recipient using a courier (e.g., an independent courier service, an agent or employee of the sender, etc.). As an example, a sender can package the physical (e.g., a box, carton, or bag), and entrust the physical asset to a courier service. The courier service conveys the physical asset from the sender's location to the recipient's location, and delivers the physical asset to the recipient. Example courier services include postal services administered by a government (e.g., the United States Postal Service), private package delivery services (e.g., United Parcel Service, FedEx, DHL Express, etc.), and delivery services specific to a particular business or group of businesses (e.g., a delivery service provided by a launderer to deliver laundered clothing to its customers, delivery services provided by a restaurant to deliver food to its customers, etc.).

In some cases, physical asset can include one or more labels (e.g., shipping labels on the exterior of the packing) to identify the physical asset, and to provide information regarding the physical asset. For example, a label can include information regarding the sender (e.g., a name and address of the sender), information regarding the intended recipient (e.g., a name and address of the intended recipient), and an identifier associated with the physical asset (e.g., a serial number, "tracking" number, order number, and/or ticket number assigned by the sender and/or a courier service that uniquely identifies the physical asset or distinguishes the physical asset from others).

In some cases, courier services do not deliver packages directly to the intended recipient. Instead, courier services can deliver physical assets to an individual or group of individuals who accept the physical assets on behalf of the intended recipients. As an example, in a multi-unit apartment building, a door attendant, concierge, or management office staff may accept physical assets on behalf of the residents of the apartment building, and notify particular residents when a physical asset has arrived. As another example, in a place of business (e.g., an office), a mail processor or receptionist may accept physical assets on behalf of the other employees, and notify particular employees when a physical asset has arrived.

In some cases, an electronic device can be used to assist in the processing of physical assets. For example, a physical asset's label can include a bar code, QR code, or other encoded value indicating a "tracking" number assigned by a courier. An individual can "scan" the bar code using an electronic device (e.g., a bar code scanning device) to determine the tracking number and ascertain information regarding the physical asset.

However, in some cases, this information might not be sufficient to enable a third party (e.g., an individual who accept the physical assets on behalf of the intended recipient) to determine the intended recipient of the physical asset. For example, although the tracking number can be used to distinguish the physical asset from other physical assets, it might not include information regarding the intended recipient (e.g., name, address, or other contact information). Further, although information regarding the intended recipient might be otherwise indicated on the label, an electronic device is often unable to automatically interpret such information sufficiently to identify the intended recipient. Further still, in many cases, the information included on a physical asset may be ambiguous, incomplete, or incorrect, making it difficult for an electronic device to interpret automatically and identify the intended recipient. As a result, manual human intervention is often required to process the physical asset and identify the intended recipient.

In some cases, human intervention is an encumbrance to processing physical assets in a quick and efficient manner. For example, humans may have difficulty interpreting certain types information (e.g., encoded information, information written in a small font, etc.). As another example, humans may have difficulty accurately transcribing and recording information (e.g., memorizing and inputting lengthy strings of text). Further, humans may have difficulty consistently processing a large number of physical assets (e.g., due to the mental and physical exertion required). Further still, humans may have difficult processing packages rapidly, due to the manual interpretation and input that is required

SUMMARY

In an aspect, a method is performed to electronically determine an identifier associated with a physical asset. The method is executed by one or more processors. The method includes receiving, by the one or more processors, one or more first database records indicating a plurality of candidate identifiers. The method also includes obtaining, by the one or more processors, one or more electronic images of the physical asset. At least one electronic image includes a graphical representation of data printed on the physical asset. The method also includes identifying, by the one or more processors based on the one or more electronic images, a plurality of regions of the data. The plurality of regions includes one or more of a first region containing graphically encoded data, and a second region containing textual data. The method also includes determining, by the one or more processors, a context of the physical asset based on the plurality of regions, selecting, by the one or more processors, the identifier from the plurality of candidate identifiers based on the plurality of regions, and generating, by the one more processors. The second database record includes an indication of the context of the physical asset, and an indication of the identifier.

Implementations of this aspect can include one or more of the following features.

In some implementations, identifying the plurality of regions includes determining a spatial template for the data based the first region, the spatial template indicating one or more spatial locations of one or more regions of the data, and identifying the second region based on the spatial template.

In some implementations, determining the spatial template includes obtaining one or more candidate spatial templates, determining a first entity associated with the physical asset based on the graphically encoded data contained in the first region, and responsive to determining the first entity, selecting the spatial template from the plurality of candidate spatial templates based on the first entity. The spatial template can correspond to the first entity.

In some implementations, the spatial template indicates a spatial location of the second region relative to a spatial location of the first region.

In some implementations, selecting the identifier includes parsing textual data disposed at the spatial location of the second region indicated by the spatial template. Selecting the identifier can further include determining a second entity associated with the physical asset based on the identifier.

In some implementations, obtaining the one or more electronic images of the physical asset includes sequentially obtaining electronic images of the physical asset until a stop criterion is satisfied. The stop criterion can correspond to a minimum number of interpretable textual characters of the data depicted in the electronic image.

In some implementations, the plurality of regions further includes a third region containing one or more of additional graphically encoded data, and a graphical representation of a logo. The first region can include a first machine-readable code, and the third region comprises a second machine-readable code.

In some implementations, determining the context of the physical asset includes determining a courier associated with the physical asset based on the plurality of identified regions.

In some implementations, selecting the identifier can include determining one or more text strings based on the second region, determining a similarity between the one or more text strings and a particular candidate identifier, and selecting that candidate identifier as the identifier. The identifier can include at least one of a legal name of an intended recipient of the physical asset, an alias of the intended recipient of the physical asset, or a location associated with the intended recipient of the physical asset.

In some implementations, selecting the identifier can include determining, for each candidate identifier, a probability that the candidate identifier is associated with the physical asset, and selecting the identifier based on the probabilities. For each candidate identifier, the probability that the candidate identifier can be associated with the physical asset is determined based on one or more of a similarity between the textual data and the candidate identifier, a similarity between the candidate identifier and one or more one or more other candidate identifiers, and historical data indicating one or more additional physical assets associated with the candidate identifier.

In some implementations, at least one of the electronic images of the package includes a graphical representation of substantially an entirety of the package. The context of the physical asset can be determined further based on the graphical representation of substantially the entirety the physical asset. Determining the context of the physical asset can include determining a semantic description of the physical asset based on the graphical representation of substantially the entirety of the physical asset.

In some implementations, the one or more processors are provided by a mobile device. Obtaining the one or more electronic images of the physical asset can include capturing the one or more electronic images of the physical asset using a camera module provided by the mobile device.

In some implementations, the method further includes transmitting a notification message to an entity associated with the identifier.

In some implementations, the method further includes determining an entity associated with the identifier, and a location associated with the entity.

Other implementations are directed to systems, devices and non-transitory, computer-readable mediums.

One or more of the implementations described herein can provide various technical benefits. For example, implementations of a physical asset recognition platform enable a computer system to automatically determine information regarding a physical asset using image-processing techniques, and automatically take one or more actions in response. This enables a computer system to automatically obtain results that would otherwise require manual intervention by a user. For instance, a computer system can automatically identify the intended recipient of an ambiguously labeled physical asset based on one or more computer-specific rules, and notify the intended recipient of receipt of the physical asset. The computer system can also automatically identify other information regarding the physical asset (e.g., the type of physical asset, a description of the physical asset, or other information) to aid in the processing of the physical asset.

The details of one or more embodiments are set forth in the accompanying drawings and the description below. Other features and advantages will be apparent from the description and drawings, and from the claims.

DETAILED DESCRIPTION

A physical asset recognition platform can enable a computer system to automatically determine information regarding a physical asset using image-processing techniques, and automatically take one or more actions in response. As an example, the platform can obtain one or more digital images of a physical asset (e.g., digital photographs), automatically determine the intended recipient of the physical asset based on an electronic interpretation of the digital images, and notify the intended recipient to collect the physical asset. Further, the platform can automatically determine other information regarding the physical asset, such as the sender of the physical asset, the courier that transported the physical asset, a description of the physical asset, the recipient's sub-address (e.g., an apartment number, unit number, room number, etc.) and other such information. Further still, the platform can record the digital images and the determined information in a database, such that they can be retrieved, processed, and/or reviewed later.

The physical asset recognition platform can be used in a variety of different contexts. As an example, a multi-unit apartment building may employ a door attendant or concierge to accept physical assets on behalf of the residents of the apartment. The door attendant or concierge can operate a computer system to interact with the platform to assist her with her duties. For instance, the door attendant or concierge can capture one or more digital images of a physical asset (e.g., upon receipt of the physical asset from a courier). Based on the images, the platform can automatically determine the intended recipient of the physical asset, and other information regarding the physical asset (e.g., the sender of the physical asset, the courier that transported the physical asset, a description of the physical asset, etc.). The platform can automatically transmit a message to the intended recipient (e.g., an email message, a text message, a telephone message, etc.) notifying her that a physical asset has arrived and is ready for collection. Further, the platform can store information regarding the physical asset in a database for further analysis and review. As another example, a place of business may employ a mail processor or receptionist to accept physical assets on behalf of the other employees. Similarly, the mail processor or receptionist can also operate a computer system to interact with the platform to assist her with her duties (e.g., by using the platform to automatically determine the intended recipient of the physical asset, and other information regarding the physical asset, notify the intended recipient, and/or store information regarding the physical asset for further analysis and review).

Figure 1:
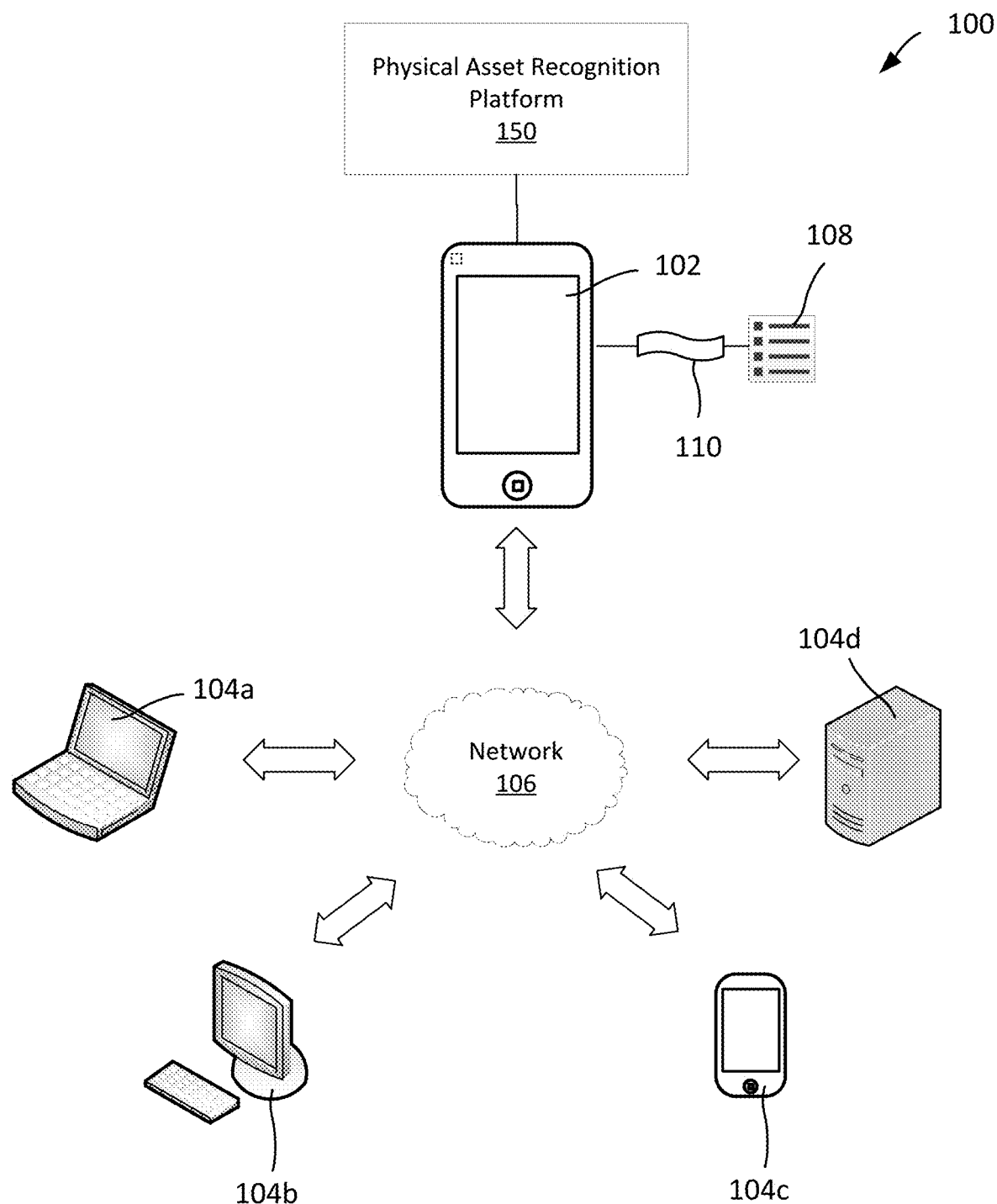
FIG. 1 is a diagram of an example system for implementing a physical asset recognition platform.

An example system 100 for implementing a physical asset recognition platform is shown in FIG. 1. The system 100 includes a physical asset recognition platform 150 maintained on a computer system 102.

The computer system 102 can be any electronic system that is used by a user to view, process, transmit and receive data. Examples of the computer system 102 include computers (such as desktop computers, notebook computers, server systems, etc.), mobile computing devices (such as cellular phones, smartphones, tablets, personal data assistants, notebook computers with networking capability), and other computing devices capable of transmitting and receiving data from a network 106. The computer system 102 can include devices that operate using one or more operating systems (e.g., Microsoft Windows, Apple OS X, Linux, Unix, Android, Apple iOS, etc.) and/or architectures (e.g., x86, PowerPC, ARM, etc.)

The computer system 102 includes a user interface 108. A user can interact with the user interface 108 to view data (e.g., data on the computer system 102 and the platform 150). A user can also interact with the user interface 108 to transmit data to other devices (e.g., to the other computer systems 104a-d). A user can also interact with the user interface 108 to issue commands 110 (e.g., to the computer system 102 and the platform 150). Commands 110 can be, for example, any user instruction to the computer system 102. In some implementations, a user can install a software application onto a computer system 102 in order to facilitate performance of these tasks.

The computer system 102 is communicatively connected to the other computer systems 104a-d using the network 106. Similarly, each computer systems 104a-d can be any electronic device that is used by a user to view, process, transmit and receive data. Examples of the computer systems 104a-d include computers (such as desktop computers, notebook computers, server systems, etc.), mobile computing devices (such as cellular phones, smartphones, tablets, personal data assistants, notebook computers with networking capability), and other computing devices capable of transmitting and receiving data from the network 106. Similarly, the computer systems 104a-d can include devices that operate using one or more operating system (e.g., Microsoft Windows, Apple OS X, Linux, Unix, Android, Apple iOS, etc.) and/or architectures (e.g., x86, PowerPC, ARM, etc.).

The network 106 can be any communications network through which data can be transferred and shared. For example, the network 106 can be a local area network (LAN) or a wide-area network (WAN), such as the Internet. The network 106 can be implemented using various networking interfaces, for instance wireless networking interfaces (such as Wi-Fi, Bluetooth, or infrared) or wired networking interfaces (such as Ethernet or serial connection). The network 106 also can include combinations of more than one network, and can be implemented using one or more networking interfaces.

The computer systems 102 and 104a-d are each illustrated as a respective single component. However, in practice, they can each be implemented on one or more computing devices (e.g., each computing device including at least one processor such as a microprocessor or microcontroller). A computer system 102 can be, for instance, a single computing device that is connected to the network 106, and a physical asset recognition platform 150 can be maintained and operated on the single computing device. In some implementations, the computer system 102 can include multiple computing devices that are connected to the network 106, and a physical asset recognition platform 150 can be maintained and operated on some or all of the computing devices. For instance, the computer system 102 can include several computing devices, and the platform 150 can be distributive on one or more of these computing devices. In some implementations, the computer system 102 need not be located locally to the rest of the system 100, and portions of a computer system 102 can be located in one or more remote physical locations.

Figure 2:
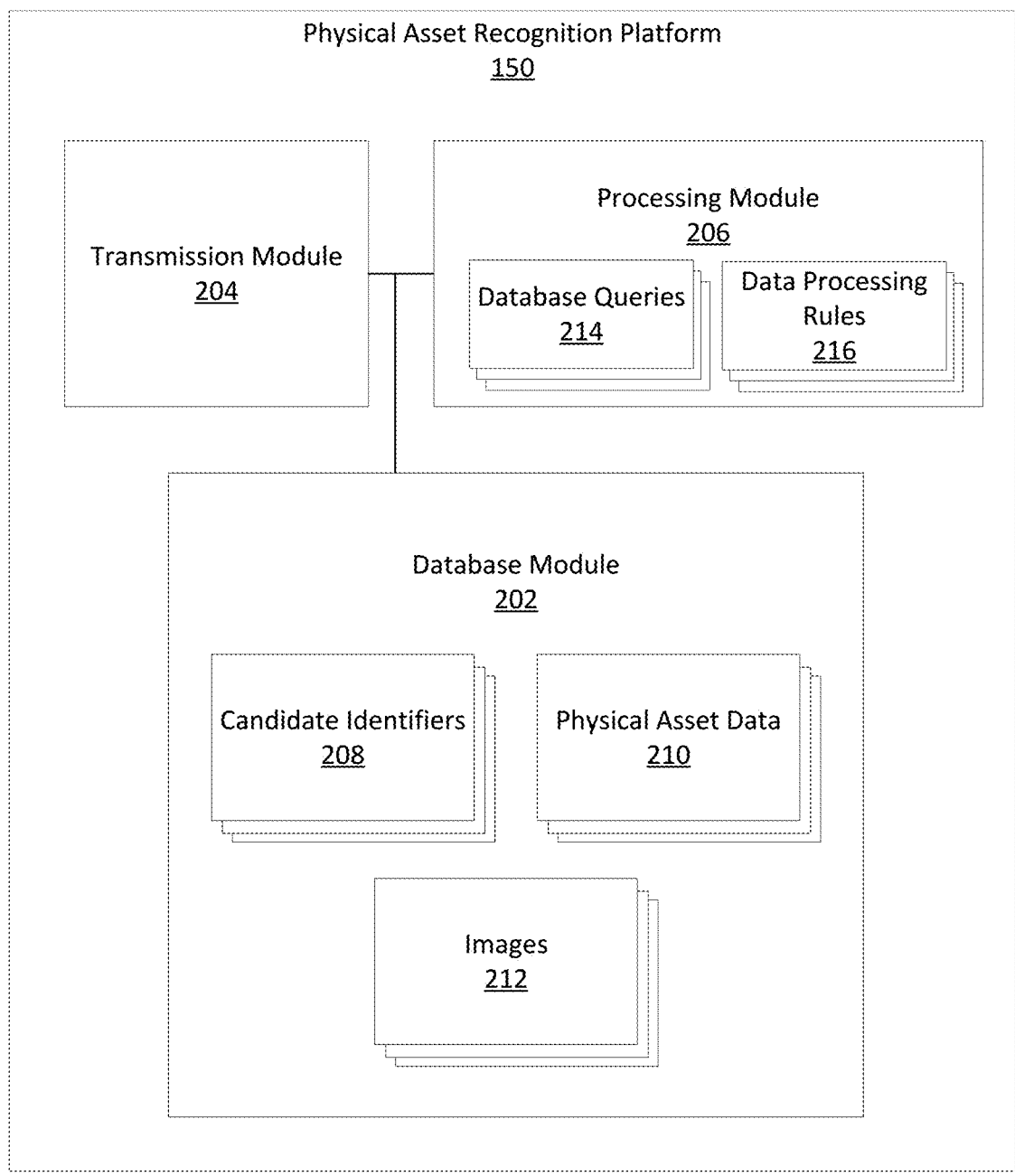
FIG. 2 a diagram of an example physical asset recognition platform.

FIG. 2 shows various aspects of the platform 150. The platform 150 includes several modules that perform particular functions related to the operation of the system 100. For example, the platform 150 can include a database module 202, a transmission module 204, and a processing module 206.

The database module 202 maintains information related to one or more candidate recipients of physical assets. For instance, the database module 202 can store one or more candidate identifiers 208, each containing information regarding a particular candidate recipient. As an example, a candidate identifier 208 can include information regarding the candidate recipient's identity (e.g., name, maiden name, nicknames, pseudonyms, alias, and so forth). As another example, a candidate identifier 208 can include a candidate recipient's contact information (e.g., e-mail address, physical address, phone number, and so forth). As another example, a candidate identifier 208 can include a candidate recipient's demographic information (e.g., age, gender, and so forth). As another example, a candidate identifier 208 can include information regarding a candidate recipient's relationship with others (e.g., indications of a candidate recipient's association with other candidate recipients, such as indications of the candidate recipient's relatives, spouse, roommates, co-workers, and so forth).

The database module 202 can also store physical asset data 210 regarding one or more physical assets. For instance, the physical asset data 210 can include a data record for each physical asset. The data record can include an indication of the identity of a particular physical asset (e.g., a serial number or "tracking" number that uniquely identifies the physical asset or distinguishes the physical asset from others). The data record can also include information regarding the sender of a particular physical asset (e.g., a name and address of the sender), and information regarding the intended recipient of the physical asset (e.g., a name and address of the recipient). The data record can also include an indication of the courier that transported the physical asset. The data record can also include a description of the physical asset (e.g., the dimensions, weight, shape, color, appearance, and/or contents of the physical asset). In some cases, the physical asset data 210 can store historical information regarding physical assets, such as a historical record of one or more physical assets that were received and processed at a particular location (e.g., a particular apartment building, place of business, etc.). In some cases, the database module 202 can store statistical metadata regarding the physical assets, such as probabilities, numerical scores, vectors, and/or heat maps that can be used to identify, classify, or otherwise characterize a physical asset. This can include, for example, a probability that a physical asset is associated with a particular candidate recipient, numerical scores quantifying a property or the physical asset, vectors qualifying multiple different properties of the physical asset, and/or heat maps indicating portions of a physical asset that are more likely to include key information.

In some cases, the data record can include information to audit the operation of the physical asset recognition platform 150. As an example, the data record can include information obtained using an automated process (e.g., the textual output of an optical character recognition process used to interpret textual data on a label of the physical asset), the underlying "raw" information that was used to obtain that information (e.g., captured images of the label), and the number of attempts that it took to obtain the data (e.g., the number of digital images that were acquired). As another example, the data record can identify whether any information was manually provided by a user (e.g., manually selected by the user from a list of suggested items, manually inputted by the user in its entirety, etc.). This enables the platform 150 and/or an administrator to assess whether there any information was interpreted incorrectly by the platform 150, and diagnose any issues with the interpretation process.

The database module 202 can also store information regarding the historical receipt patterns or trends of one or more candidate recipients. As an example, the database module 202 can information such as the number of physical assets received by a particular candidate recipient, the type of physical assets received by the candidate recipient, the frequency at which physical assets are received by the candidate recipient, and so forth. As another example, the database module 202 can store information regarding the percentage of a certain type of physical asset that was received by the candidate recipient relative to the total number of physical assets that are received.

The database module 202 can also store one or more images 212 of one or more physical assets. As an example, the images 212 can include digital images captured by a digital camera module. The images 212 can include data stored according to one or more image file formats, such as Bitmap (BMP) file format, Joint Photographic Experts Group (JPEG) file format, Tagged Image File Format (TIFF), Graphics Interchange Format (GIF), Portable Network Graphics (PNG) file format, Exchangeable image file format (Exif), and/or any other image file format. In some cases, the images 212 can include a sequence of images captured in a sequence (e.g., in the form of a video or movie). Sequences of images can be stored according to one or more image file formats, such as WebM file format, Audio Video Interleave (AVI) file format, QuickTime File Format (QTFF), Motion Picture Experts Group (MPEG) file format, and/or any other video file format Although different examples of information are described above, these are merely illustrative. In practice, the database module 202 can store any information related to the platform 150, candidate recipients, and/or physical assets.

The processing module 206 processes data stored or otherwise accessible to the platform 150. For instance, the processing module 206 can execute automated or user-initiated processes that manipulate data pertaining to one or more physical assets or candidate recipients. As an example, the processing module 206 can generate and then transmit database queries 214 to database module 202 to retrieve, modify, and/or delete data stored on the database module 202. As another example, the processing module 206 can generate and execute the database queries 214 directly (e.g., the processing module 206 can execute the database queries 214 to directly retrieve, modify, and/or delete data stored in the database module 202). Further, the processing module 206 can process data that is received from the transmission module 204. Likewise, processed data from the processing module 206 can be stored on the database module 202 (e.g., using one or more database queries 214) and/or sent to the transmission module 204 for transmission to other devices. Example processes that can be performed by the processing module 206 are described in greater detail below.

Further, the database module 202 also can execute database queries 214. Database queries can be, for example, commands that specify that particular data be retrieved, modified, and/or deleted from the database module 202. In response, the database module 202 can execute the queries to fulfill the request, or direct another component of the physical asset recognition platform 150 to execute the query. In some cases, database queries 214 can be generated by the processing module 206 (e.g., based on a user's instructions), and transmitted to the database module 202 for execution. In some cases, database queries 214 can be generated and executed by the processing module 206 directly (e.g., the processing module 206 can directly retrieve, modify, and/or delete data stored in the database module 202).

In some cases, the database module 202 and/or the processing module 206 can process data stored in the database module 202 in accordance with one or more data processing rules 216. These data processing rules 216 can specify particular conditions and/or factors for processing data, such that the platform 150 can automatically interpret a physical asset and perform particular actions with respect to the physical asset. As an example, the data processing rules 216 can specify how certain properties of the physical assets (e.g., intended recipient, sender, description, etc.) can be automatically determined based on particular properties of images 212 of the physical asset, information regarding candidate recipients contained within the candidate identifiers 208, physical asset data 210 regarding previously processed physical assets, and so forth. As another example, the data processing rules 216 can specify when and how notifications are automatically transmitted to the intended recipients of physical assets. Although the data processing rules 216 are illustrated with respect to the processing module 206, the data processing rules 216 also can be stored by the database module 202. Example implementations of the data processing rules 216 are discussed in greater detail below.

The transmission module 204 allows for the transmission of data to and from the platform 150. For example, the transmission module 204 can be communicatively connected to the network 106, such that it can transmit data to the computer systems 104a-d, and receive data from the computer systems 104a-d via the network 106. As an example, the platform 150 can transmit messages to the computer system 104a-d (e.g., notifications regarding physical assets) via the transmission module 204.

As described above, one or more implementations of the physical asset recognition platform 150 automatically determine information regarding a physical asset using image-processing techniques, and automatically take one or more actions in response. An example of this functionality is illustrated in FIGS. 3A-3F.

Figure 3A:
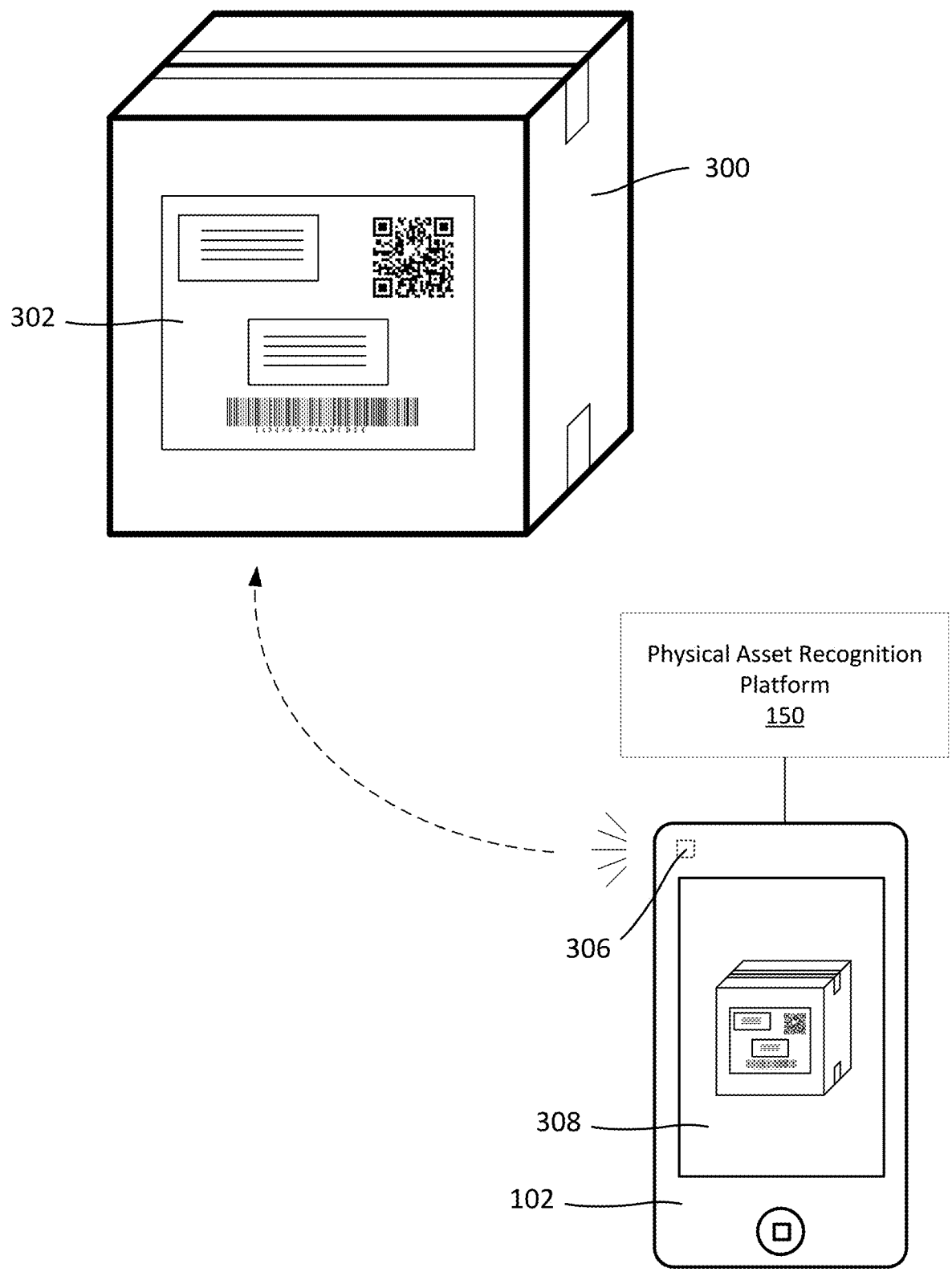
FIGS. 3A-3F are diagrams showing an example usage of the physical asset recognition platform.

An example physical asset 300 is shown in FIG. 3A. The physical asset 300 can be, for example, a package (e.g., a box, a bag, etc.) having a label 302 affixed to its exterior (e.g., an external shipping label with printed information).

The physical asset 300 is delivered to a user. As an example, a courier can deliver the physical asset 300 to a person responsible for accepting physical assets on behalf of others (e.g., a door attendant, concierge, mail processor, receptionist, etc.).

The user can utilize the platform 150 to assist her with her duties. For example, the user can operate a digital camera module 306 to capture one or more images 308 of the physical asset 300. In some cases, the images 308 can be captured by a digital camera module 306 integrated into the computer system 102. For instance, the computer system 102 can be a mobile device, such as a smart phone, with a "built in" digital camera module 306. In some cases, the images can be captured by a digital camera module 306 separate from the computer system 102 (e.g., a discrete camera module that transmits captured images to the computer system 102 via a direct connection to the computer system 102, or via the network 106). A digital camera module 306 can include, for instance, one or more optical sensors, such as charged coupled devices (CCDs) or complementary metal-oxide semiconductor (CMOS) devices for capturing images in an electronic format.

In some cases, the digital camera module 306 can capture a single image in response to a user's command. For instance, a user can position the digital camera module 306 towards the physical asset 300, and input a command (e.g., to the computer system 102) instructing the digital camera module 306 to capture an image. In response, the digital camera module 306 can capture a single image, and provide the image to the platform 150. In some cases, the digital camera module 306 can automatically capture several images in a sequence in response to a user's command. For instance, a user can position the digital camera module 306 towards the physical asset 300, and input a command (e.g., to the computer system 102) instructing the digital camera module 306 to capture images. In response, the digital camera module 306 can capture several images in a sequence (e.g., according to a particular image capture frequency), and provide some or all of the images to the platform 150. In some cases, the digital camera module 306 can automatically capture one or more images without specific instruction from a user.

In some cases, the computer system 102 can instruct the user to capture multiple digital images showing different views of the physical asset 300 and/or the label 302. For example, the computer system 102 can prompt the user to position the digital camera module 306 towards the physical asset 300 such that the label 302 is in view, and capture one or more images using the digital camera module 306. Further, the computer system 102 can prompt the user to position the digital camera module such that different sides of the physical asset 300 are in view, and capture one or more images using the digital camera module 306. Further, the computer system 102 can prompt the user to position the digital camera module such that the entirety of the physical asset is in view, and capture one or more images using the digital camera module 306. In some cases, the computer system 102 can prompt the user to position the digital camera module 306 towards the physical asset 300 such that one or more other features of the physical asset 300 are in view (e.g., a portion of the label 302 showing the name of the recipient in isolation, a portion of the label 302 showing the barcode in isolation, etc.).

In some cases, the computer system 102 can provide feedback to the user regarding the capturing of digital images. For example, the computer system 102 can prompt the user to position the digital camera module 306 such that it is in a first position (e.g., facing the physical asset 300 such that the label 302 is in view), and automatically capture one or more digital images using the digital camera module 306. The computer system 102 can process each digital image to determine whether the digital image is suitable for use. In some cases, the computer system 102 determine whether a digital image is suitable for use based on one or more properties of the digital image. For example, the computer system 102 can determine whether the digital image is sufficiently in focus, whether the physical asset is framed property in the digital image, whether the physical asset is sufficiently large in the digital image, and so forth, and assign a score for each factor. If the score is sufficiently high, the computer system 102 can determine that the digital image is suitable for use. As another example, the computer system 102 can determine a motion of the digital camera module 306 (e.g., using an accelerometer or other motion sensor that is physically coupled to the digital camera module 306) to determine whether the digital camera module 306 is experiencing motion that may blur the captured digital images. If the motion is sufficiently low for a sufficiently long period of time (e.g., less than a threshold acceleration value or at least a threshold period of time), the computer system 102 can determine that the digital image is suitable for use. As another example, the computer system 102 can determine whether the digital image is suitable for use based on machine learning techniques (e.g., using a trained classifier or regression model, such as a support vector machine, logistic regression, neural network, etc.).

If the digital image is suitable for use, the computer system 102 can notify the user than a suitable image was captured (e.g., a confirmation "beep" or other auditory message, a visual message or alert, tactile feedback, and/or another other notification), and stop capturing digital images using the digital camera module 306. Auditory messages and tactile feedback can be beneficial, for example, as they enable a user to determine that a suitable image was captured, without requiring that the user avert his gaze from the physical asset. Visual messages can be beneficial, for example, as they enable a user to determine that a suitable image was captured in noisy environments and/or if the user is hard of hearing. Notification can be generated, for example, using display devices (e.g., display screen, light emitting diodes, etc.), audio speakers, tactile feedback modules, etc. In some cases, the computer system 102 can capture digital images depicting multiple different physical assets in the same digital image, and separately process each of the physical assets (e.g., as described below).

If the digital image is not suitable for use, the computer system 102 can continue capturing digital images using the digital camera module 306 until a suitable image is captured. Once a suitable image has been captured, the computer system 102 can prompt the user to position the digital camera module 306 such that it is in a second position (e.g., showing an entirety of the physical asset 300), and repeat the image capturing process until a suitable image is captured.

Figure 3B:
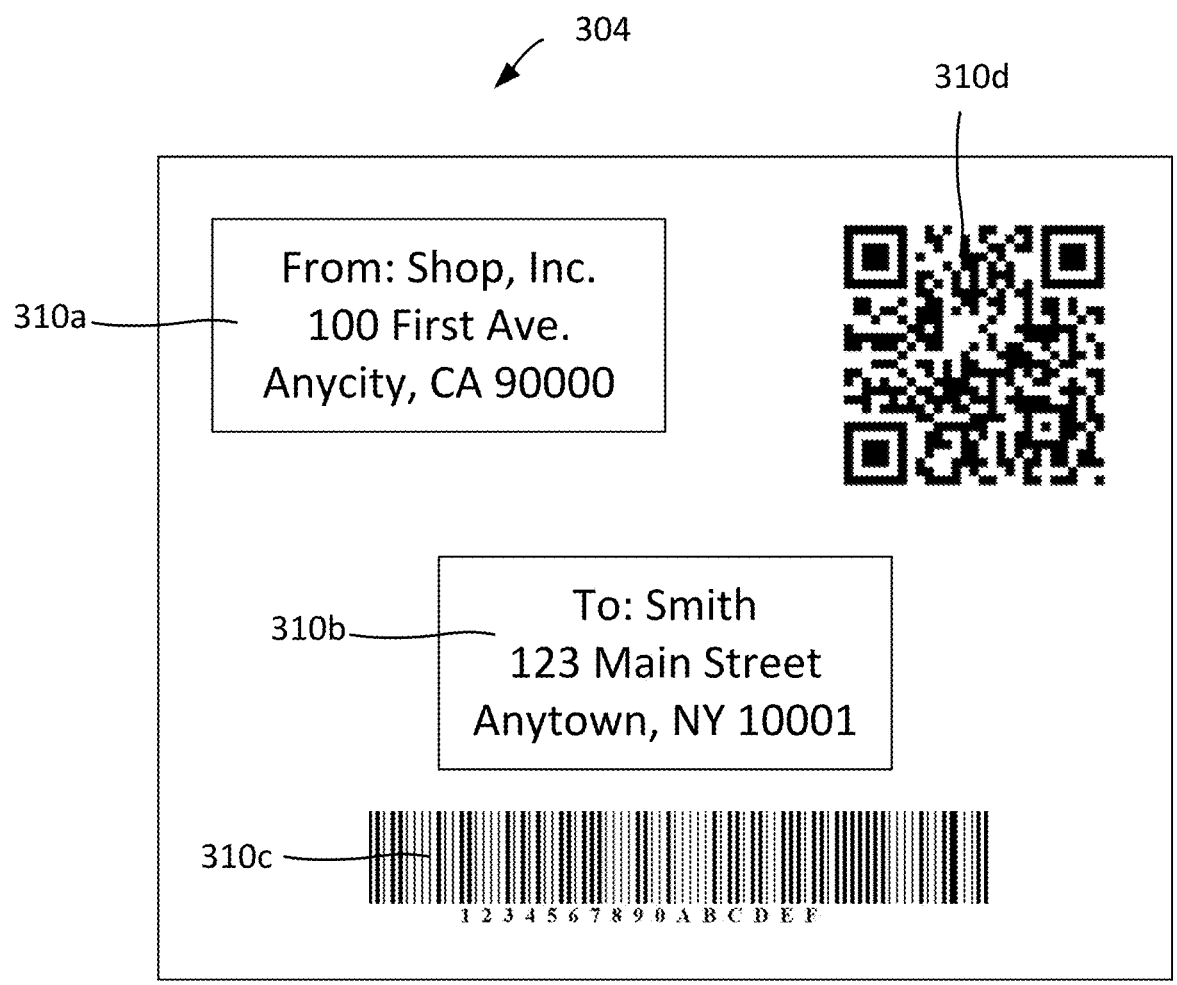

A label 302 can present one or more different types of information. For instance, a label 302 can include one or more portions presenting textual data, and/or one or more portions presenting graphically encoded data. Graphically encoded data can include, for instance, data that is graphically encoded with respect to one dimension (e.g., a bar code), or data that is graphically encoded with respect to multiple dimensions (e.g., a QR code). An example label 302 is shown in FIG. 3B. In this example, the label 302 includes a portion 310a presenting textual data regarding the sender of the physical asset 300, a portion 302b presenting textual data regarding the intended recipient of the physical asset 300, a portion 310c representing data graphically encoded with respect to one dimension, and a portion 310d representing data graphically encoded with respect to multiple dimensions.

Figure 3C:
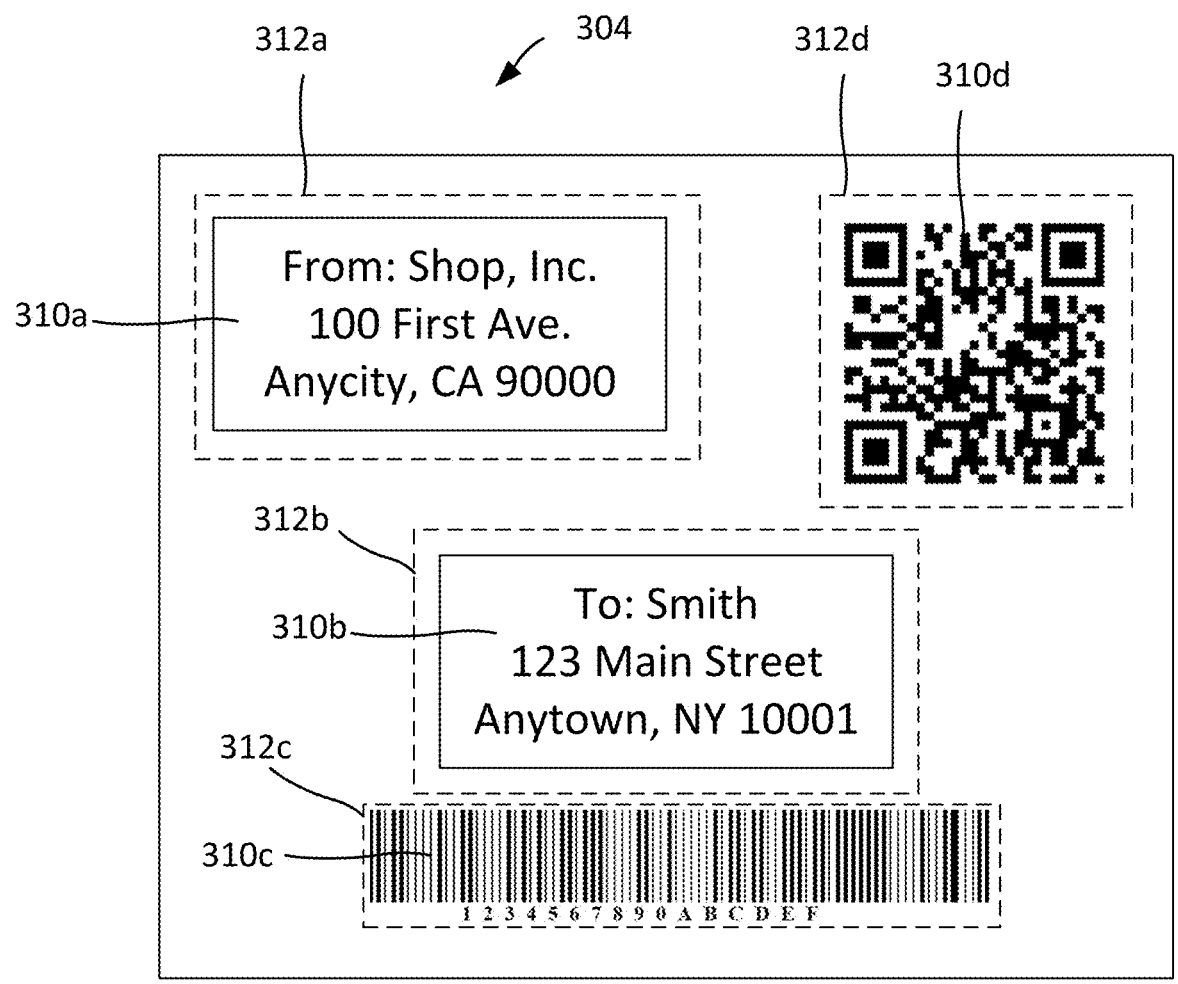

The platform 150 can automatically identify one or more of the portions 310a-d based on the images 308 (e.g., "segmenting" or "blocking" the images 308 to identifying the portions 310a-d). For example, as shown in FIG. 3C, the platform 150 can determine that the portion 310a is spatially defined by a boundary 312a, the portion 310b is spatially defined by a boundary 312b, the portion 310c is spatially defined by a boundary 312c, and the portion 310d is spatially defined by a boundary 312d.

In some cases, segmentation or blocking can be applied to intermediary representations of the physical asset that are derived from the images 308 (e.g., a representation of the physical asset derived based on several images in a sequence, such as in a video).

In some cases, the platform 150 can automatically identity portions of the label 302 using one or more data processing rules 216. For instance, the data processing rules 216 can specify the expected location of certain types of information on a label 302 based on known information regarding the physical asset 300.

As an illustrative example, the data processing rules 216 can define a spatial template specifying that a particular courier is known to place specific types of information in specific locations on a label. Further, the data processing rules 216 can specify that the same courier utilizes serial numbers having a particular pattern in identifying packages. Similar rules can be stored with respect to one or more additional couriers. To identify each of the portions of the label, the platform 150 can parse the captured image for a serial number printed on the label (e.g., a textual representation of the serial number and/or a graphically encoded representation of the serial number), and determine that the label is associated with a particular courier based on the data processing rules 216 (e.g., based on a similarity between the pattern of the serial number printed on the label and the known pattern of serial numbers used by the courier). Upon determining that the label is associated with the particular courier, the platform 150 can retrieve the spatial template for that courier, and determine, based on the spatial template, that the courier is known to place specific types of information (e.g., textual information, graphically encoded data, etc.) in specific locations on a label. Based on this determination, the platform 150 can identify the location of each of the portions on the label and the type of data presented in each of the portions.

As another example, the platform 150 can automatically identity portions of the label 302 that include text, and demarcate each of those portions using bounding boxes (e.g., boundaries enclosing the text, such as a rectangular or other polygon, or a freeform boundary). Using the data processing rules 216, the platform 150 can assign an intermediary set of features representing the textual data in each of the bounding boxes. These features can include numerical values (e.g., scalars and/or vectors) that characterize each bounding box or characteristics of the image more generally. Further, using the data processing rules 216, the platform 150 can determine, for each bounding box, a numerical score indicating the likelihood that the bounding box contains information regarding the intended recipient of the physical asset (e.g., a name, address, sub-address, etc.).

The platform 150 can interpret information presented by the label 302 in various ways. In some cases, the platform 150 can perform optical character recognition (OCR) to parse textual information. In some cases, the platform 150 can analyze the visual aspects of a label to identify visual features indicative of a particular type of graphically encoded data (e.g., position or alignment markers used in a particular type of bar code or QR code). Based on these features, the can determine the presence of that particular type of graphically encoded data on the label 302, and interpret the graphically encoded data in accordance with the formats or standards associated with that particular type of graphically encoded data. Interpreted information can be stored, for example, using the database module 202.

In some cases, the platform 150 can automatically identity key portions of the label 302 using regular expressions and natural language processing techniques (e.g., to identify key identifier words), and image processing techniques (e.g., to locate where recipient is in relation to key identifier words). Examples of key identifier words include the location's known name (e.g., the name of a building), city, state, and postal code. Other examples include common words that appear in known positions on a label (e.g., a vendor's name, "tracking," "number", "ship," among others).

In some cases, the platform 150 can automatically distinguish certain portions of the label 302 from others, even if those portions appear to include similar types for information. For example, some labels can include multiple different barcodes (e.g., a barcode associated with a courier service alongside a barcode associated with the sender). Using the data processing rules 216 (e.g., a spatial template specifying that particular couriers and senders are known to place specific types of information in specific locations on a label), the platform 150 can automatically distinguish one barcode from another. For another example, some labels can include multiple different portions of text (e.g., text corresponding to the intended recipient alongside text associated with a tracking number). Using the data processing rules 216 (e.g., a spatial template specifying that particular couriers and/or senders are known to place specific types of information in specific locations on a label), the platform 150 can automatically distinguish one portion of text from another.

As described above, in some cases, the computer system 102 can provide feedback to the user regarding the capturing of digital images. For example, the computer system 102 can prompt the user to position the digital camera module 306 such that it is facing the physical asset 300 such that the label 302 is in view, and automatically capture one or more digital images using the digital camera module 306. The computer system 102 can process each digital image to determine whether the digital image is suitable for use. As an example, the computer system 102 can attempt to identify one or more characters printed on the label 302 (e.g., using OCR techniques). If the number of identifiable characters meets or exceeds a threshold number, the computer system 102 can determine that the digital image is suitable for use. In turn, the computer system 102 can notify the user than a suitable image was captured (e.g., a confirmation "beep" or message), and stop capturing digital images using the digital camera module 306. However, if the number of identifiable character is less than the threshold number, the computer system 102 can continue capturing digital images using the digital camera module 306 until a suitable image is captured. In this manner, the computer system 102 can iteratively process digital images of the label 302 until a suitable digital image is captured.

Further, the platform 150 can interpret the information presented on the label 302, and determine the intended recipient of the physical asset 300 asset based on the interpretation. For instance, the platform 150 can automatically determine the intended recipient of the physical asset 300 based on one or more data processing rules 216.

As example, the data processing rules 216 can specify that a particular courier is known to place information regarding the intended recipient of a physical asset on a specific location of a label. Further, the data processing rules 216 can specify that the same courier utilizes serial numbers having a particular pattern in identifying packages. To identify the intended recipient of the physical asset, the platform 150 can parse the captured image for a serial number printed on the label, and determine that the label is associated with a particular courier based on the data processing rules 216 (e.g., based on a similarity between the pattern of the serial number printed on the label and the known pattern of serial numbers used by the courier). Upon determining that the label is associated with the particular courier, the platform 150 can retrieve the spatial template for that courier, and determine, based on the spatial template, that the courier is known to place textual information regarding the intended recipient of the physical asset in a specific location on the label. Based on this determination, the platform 150 can interpret the information stored at the specified location, and determine the intended recipient based the interpretation.

In some cases, the platform 150 can identify the intended recipient of the physical asset 300 based on the candidate identifiers 208 stored in the database module 202. As described herein, candidate identifiers 208 contain information regarding candidate recipients of physical assets. As an example, if the platform 150 is used with respect to a particular apartment, candidate identifiers 208 can include information regarding each of the occupants of the apartment. As another example, if the platform 150 is used with respect to a particular place of business, candidate identifiers 208 can include information regarding each of the employees, organizations, or other entities at that the place of business. As described herein, each candidate identifier 208 can include information regarding the particular candidate recipient's identity, contact information, demographic information, as well as a candidate recipient's relationship with others.

The platform 150 can identify the intended recipient of the physical asset 300 based on a similarity between information presented on the label 302 and information contained in the candidate identifiers 208. As an example, the platform 150 can determine that the label 302 includes a portion indicating the name of the intended recipient. The platform 150 can interpret the information contained in this portion, based on the candidate identifiers 208, identify a particular candidate recipient having the same or similar name. In response, the platform 150 can identify that candidate recipient as the intended recipient of the physical asset 300.

As another example, the platform 150 can determine that the label 302 includes a portion indicating the mailing address of the intended recipient (e.g., an address, a sub-address, etc.). The platform 150 can interpret the information contained in this portion, based on the candidate identifiers 208, identify a particular candidate recipient having the same or similar mailing address. In response, the platform 150 can identify that candidate recipient as the intended recipient of the physical asset 300.

In some cases, the platform 150 can identify the intended recipient of the physical asset 300 based on a probabilistic model that accounts for one or more different factors or conditions. Example factors or conditions include information presented on the label 302 of the physical asset 300, properties of the physical asset (e.g., dimensions, shape, packaging, description, contents, etc.), information regarding candidate recipients (e.g., information contained within the candidate identifiers 208), and/or historical information regarding physical assets received by the candidate recipients (e.g., the physical asset data 210). This can be beneficial, for example, as it enables the platform 150 to more accurately and efficiently determine the intended recipient of the physical asset 300, even if the information contained on the label 302 is ambiguous.

As an illustrative example, the label 302 includes textual information regarding the intended recipient of the physical asset 300 in the portion 312b. The platform 150 can parse the information contained within the portion 312b, and determine that the physical asset 300 is intended for an entity named "Smith" having the address "123 Main Street, Anytown, N.Y. 10001" (a multi-unit apartment). However, the portion 312b does not specifically indicate the full name of the intended recipient, or the specific unit number (e.g., apartment number) the intended recipient.

Figure 3D:
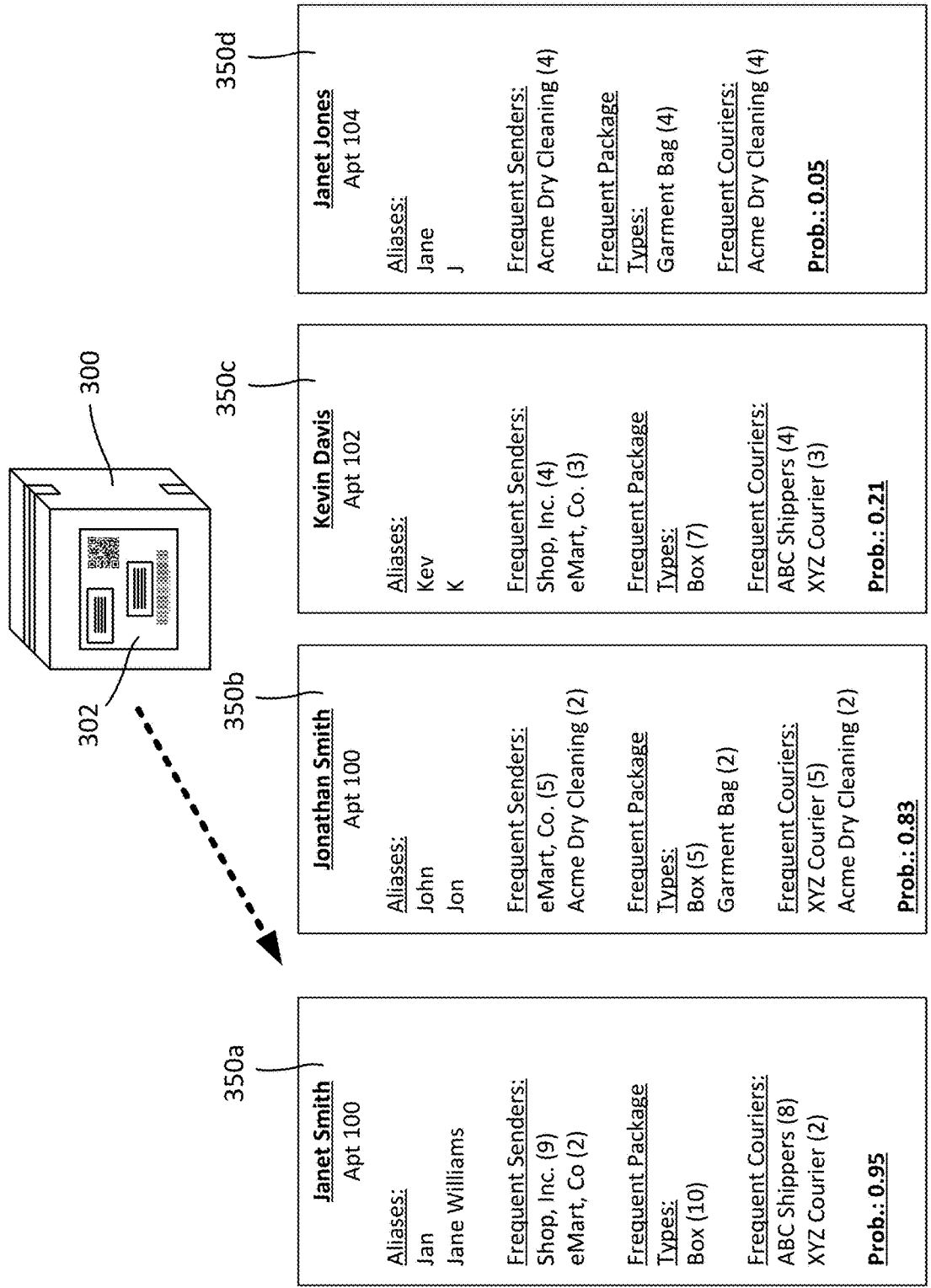

FIG. 3D shows data records 350a-d regarding several different candidate recipients at the multi-unit apartment. Each data record 350a-d represents information stored by the database module 202 with respect to a particular candidate recipient (e.g., information contained within the candidate identifiers 208 and the physical asset data 210). For instance, each data record 350a-d indicates a name of a particular candidate recipient, the location of that candidate recipient (e.g., a sub-address, such as a particular unit of an apartment), and aliases or nicknames of the candidate recipient. Further, each data record 350a-d also indicates entities that frequently send physical assets to a particular candidate recipient (e.g., vendors from which the candidate recipient frequently purchases shipped goods), types of physical assets that the candidate recipient frequently receives (e.g., boxes, bags, or other types of packages), and couriers that frequently transport physical assets intended to the candidate recipient.

As shown in FIG. 3D, there are two candidate recipients having the last name "Smith" (e.g., indicated by data records 350a and 350b). Thus, the name indicated on the label 302 alone is not sufficient to determine the intended recipient of the physical asset 300. Further, as the label 302 did not identify the specific location of the intended recipient (e.g., a specific apartment number), the address indicated on the label 302 does not resolve the ambiguity.

However, the platform 150 can determine a scoring metric for each of the candidate recipients with respect to physical asset 300. The scoring metric can be, for example, a numerical score that indicates the likelihood that a particular candidate recipient is the intended recipient of the physical asset 300. Scoring metrics can be determined based on one or more data processing rules 216, information contained in the data records 350a-d, and information regarding the physical asset 300.

As an example, if the label 302 indicates a name of an intended recipient that is similar to the name, maiden name, pseudonym, alias, or nickname of a particular candidate recipient, the scoring metric for that candidate recipient can be higher. However, if the label 302 indicates a name that is not similar to the name, maiden name, pseudonym, alias, or nickname of a particular candidate recipient, the scoring metric for that candidate recipient can be lower. In this example, the scoring metric for "Jane Smith" and "Jonathan Smith" can be assigned a relatively higher weight based on this factor, as their names both contain "Smith."

As another example, if the label 302 indicates a name of a sender that is frequently associated with a particular candidate recipient, the scoring metric for that candidate recipient can be higher. However, if the label 302 indicates a name of a sender that is infrequently associated with a particular candidate recipient (or has not previously been associated with the candidate recipient), the scoring metric for that candidate recipient can be lower. In this example, the scoring metric for "Jane Smith" and "Kevin Davis" can be assigned a relatively higher weight based on this factor, as they both frequently received physical assets from "Shop, Inc." in the past.

As another example, if the physical asset 300 is of a type that is frequently associated with a particular candidate recipient, the scoring metric for that candidate recipient can be higher. However, if the physical asset 300 is of a type that is infrequently associated with a particular candidate recipient (or has not previously been associated with the candidate recipient), the scoring metric for that candidate recipient can be lower. In this example, the platform 150 determines that the physical asset 300 is a box (e.g., instead of another type of package, such as a garment bag). Accordingly, the scoring metric for "Jane Smith," "Jonathan Smith," and "Kevin Davis" can be assigned a relatively higher weight based on this factor, as they each frequently receive physical assets in the form of boxes.

In some cases, the platform 150 can automatically determine a description of the physical asset 300 based on an analysis of the captured images. For instance, the platform 150 can perform one or more object recognition techniques with respect to the captured images to classify the physical asset 300. In some cases, the platform 150 can determine a description of the physical asset based on manual input by the user (e.g., a description of the object manually provided by the user).

As another example, if the label 302 indicates a courier that is frequently associated with a particular candidate recipient, the scoring metric for that candidate recipient can be higher. However, if the label 302 indicates a courier that is infrequently associated with a particular candidate recipient (or has not previously been associated with the candidate recipient), the scoring metric for that candidate recipient can be lower. In this example, the platform 150 determines that the physical asset 300 was transported by the courier "ABC Shippers" (e.g., based on the serial number printed on the label 302). Accordingly, the scoring metric for "Jane Smith" and "Kevin Davis" can be assigned a relatively higher weight based on this factor, as they both frequently receive physical assets delivered by "ABC Shippers" in the past.

In some cases, each factor can be assigned an equal weight or influence with respect to the scoring metric. In some cases, each factor can be assigned a different weight or influence with respect to the scoring metric. For instance, certain factors (e.g., similarity in name and/or location) can be assigned a relatively higher weight, while other factors (e.g., frequent couriers) can be assigned a relatively lower weight. In practice, the weight or influence assigned to each factor can different, depending on the implementation. In some cases, weights or influences of each factor can be empirically determined (e.g., based on experimental data or historical data). Further, in some cases, the weights or influence of each factor can be dynamically changed during operation of the platform 150 (e.g., to account for changes in behavior of users or new trends).

In this example, based on each of these factors, the platform 150 determines that "Janet Smith" has the highest scoring metric with respect to the physical asset 300. Accordingly, the platform 150 can identifies "Janet Smith" as the intended recipient of the package.

Although example factors and conditions are described above, it is u understood that these are merely illustrative examples. In practice, other factors and conditions also can be considered in determining a scoring metric, either in addition or instead of those described above.

For instance, a scoring metric can vary based on a candidate's demographic information. As an example, a particular vendor may tend to sell goods to customers of a particular age. Accordingly, if the platform 150 determines that a physical asset was sent by a particular vendor, the platform 150 can increase the scoring metric of candidate recipients having a similar age. As another example, a particular vendor may tend to sell goods to customers of a particular gender. Accordingly, if the platform 150 determines that a physical asset was sent by a particular vendor, the platform 150 can increase the scoring metric of candidate recipients having the same gender. As another example, the platform 150 can obtain information regarding the location of the computer system 102 (e.g., using a global positioning system [GPS] module, or based on wireless signals obtained from a wireless radio, such as a Wi-Fi or cellular radio). Using this information, the platform 150 can determine the physical location where a physical asset is being processed, and determine intended recipients based on this information.

Figure 3E:
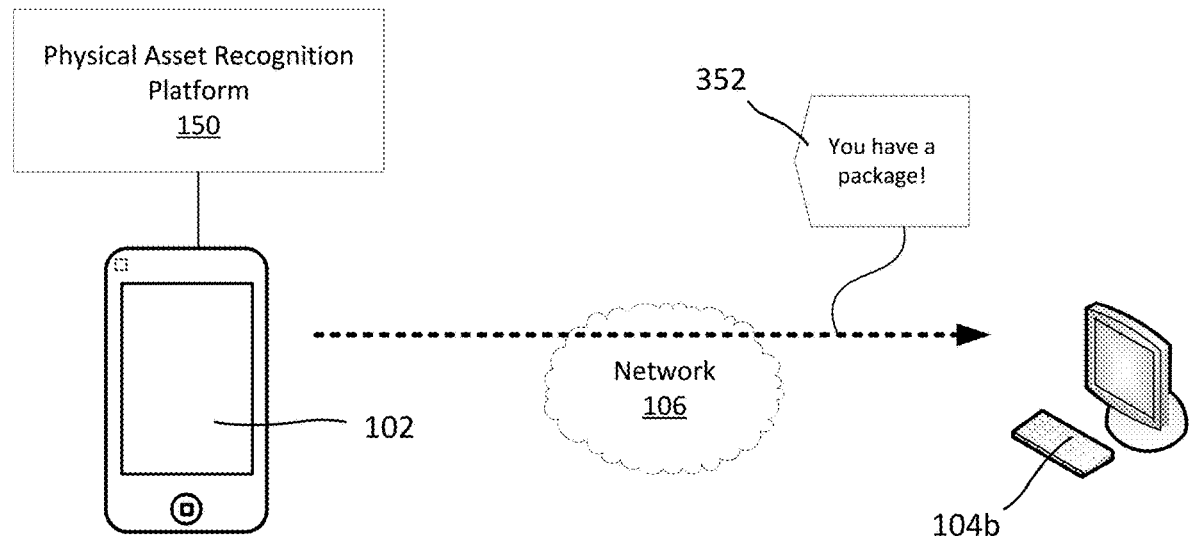

As described herein, the platform 150 can automatically take one or more actions in response to determining the intended recipient of the physical asset 300. For instance, the platform 150 can automatically transmit a message 352 to the intended recipient (e.g., an email message, a text message, a telephone message, etc.) notifying her that a physical asset has arrived and is ready for collection. For example, as shown in FIG. 3E, the platform 150 can automatically transmit a message 352 to a computer system 104*b* associated with the intended recipient via the network 106.

Figure 3F:
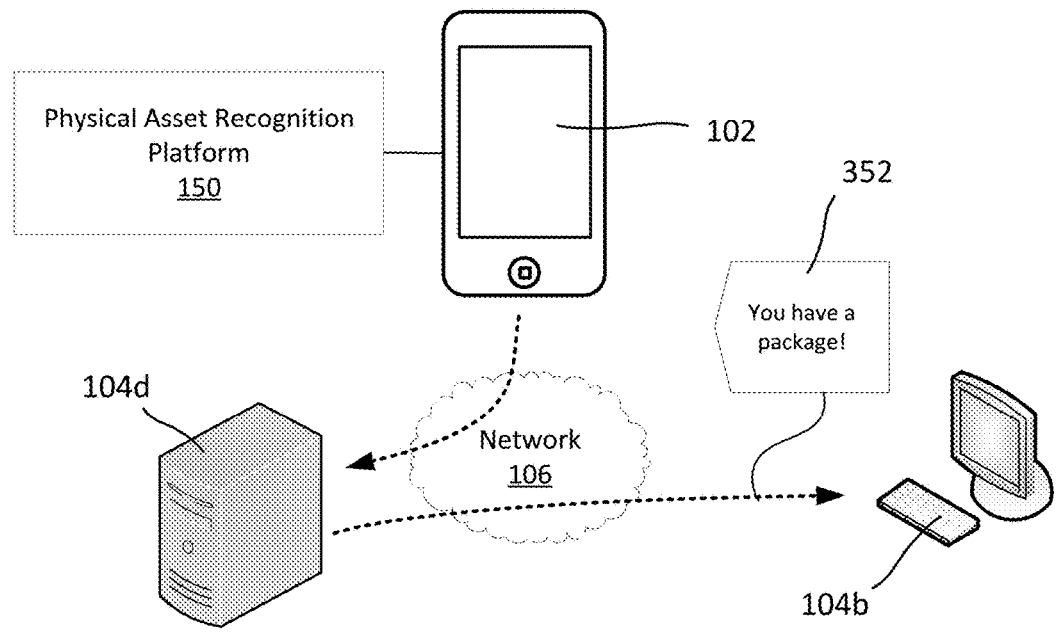

In some cases, the platform 150 can automatically transmit the message 352 to the intended recipient via in intermediary system. For example, as shown in FIG. 3F, the platform 150 can automatically transmit a message 352 to a computer system 104*b* associated with the intended recipient via the network 106, using a computer system 104*d* (e.g., a server computer system) as an intermediary.

The platform 150 also stores the information regarding the physical asset 300 in the database module 202, such that the information can be retrieved, processed, and/or reviewed later. As an example, the platform 150 can store one or more images of the physical asset 300 and/or the label 302, and information parsed from the label 302 (e.g., names, addresses, couriers, etc.). Further, the platform 150 can store the predicted intended recipient of the physical asset 300 (e.g., a name, an address, a reference to a particular data record 350*a-d*, or other indication). Further, the platform 150 can store the scoring metrics used to make the prediction. In some cases, the stored information can be used as a record for the physical assets received and processed by the platform 150 (e.g., a record of packages received at a particular location). In some cases, the stored information can be used to improve the platform 150 (e.g., to troubleshoot situations in which a physical asset was improperly attributed to the wrong candidate recipient). In some cases, the stored information can include location information (e.g., the location of the computer system 102 used the process the physical asset).

In some cases, the platform 150 can determine information regarding the physical asset 300, and present the information to the user for review. Further, the user can manually modify one or more portions of the information (e.g., to correct errors or resolve ambiguities). For instance, the platform 150 can present "suggestions" regarding the intended recipient of the physical asset, the sender of the physical asset, the courier that transported the physical asset, a description of the physical, and so forth. The user can review these suggestions, and if needed, correct one or more of the suggestions (e.g., by selecting an alternative option presented by the computer system 102 or manually entering alternative information).

In some cases, the platform 150 can determine that a physical asset is unlikely to correspond to any of the known candidate recipients at a particular location. As an example, if a physical asset's scoring metric for each candidate recipient at a particular location is sufficiently low (e.g., below a threshold value), the platform 150 can determine that the intended recipient of the physical asset is unlikely to be any of the known occupants or residents at a particular location. The platform 150 can indicate this information to a user of the platform 150 and/or record this information for future review (e.g., using the database module 202). This could be beneficial, for example, in identifying physical assets that have been misaddressed by the sender and/or mis-delivered by the courier. This could also be beneficial, for example, in identifying unknown and/or unauthorized occupants at a particular location (e.g., individuals that are subletting a unit without the landlord's permission, individuals that are illegally squatting in a unit, etc.). In some cases, the platform 150 can automatically determine that a particular unit is likely to occupied by an unknown or unauthorized entity, and identify that unit to a user of the platform 150.

Figure 4:
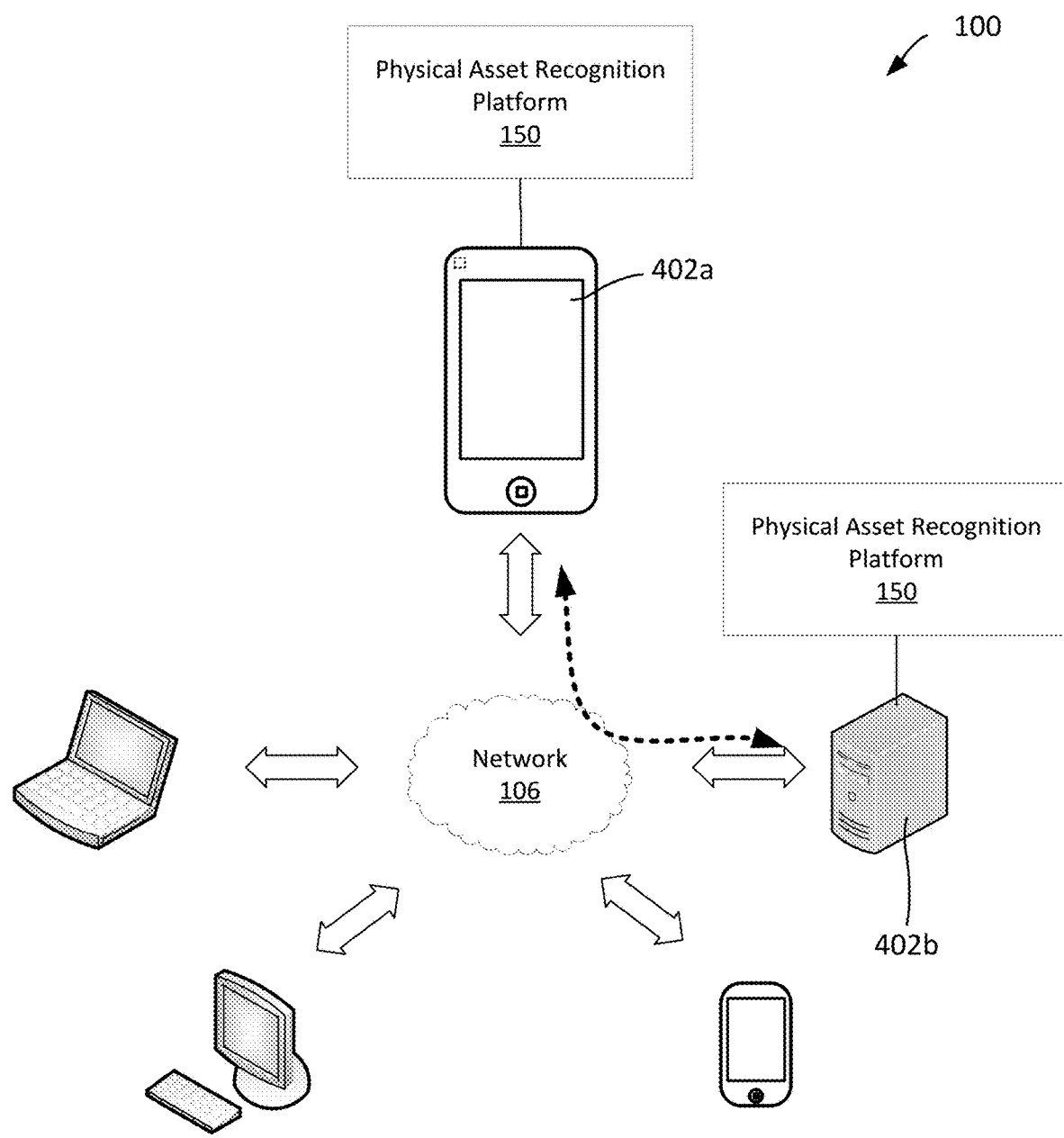
FIG. 4 is a diagram of another example system for implementing a physical asset recognition platform.

In the example shown in FIG. 1, the physical asset recognition platform 150 is implemented on a single computer system. However, this need not be the case. For example, in some cases, the platform 150 can be distributive on several different computer systems, and the functionality of the platform 150 can be provided by the computer systems collectively. Further, in some implementations, the platform 150 can be implemented using multiple different computer systems, such of which are not located locally with the others. As an example, FIG. 4 shows an alternative configuration of the system 100. In this configuration, the physical asset recognition platform 150 is implemented on a computer system 402*a* (e.g., a mobile device) and a computer system 402*b* (e.g., a server computer system) in conjunction. This can be useful, for example, in improving the effectiveness of the system 100. For instance, certain functions may be more effectively performed by one computer system (e.g., a mobile device may be better equipped to capture images of a physical asset), while other functions may be more effectively performed by another computer system (e.g., a server computer system may be better equipped to interpret the images and store data in a database). Further, this can be useful in simplifying the deployment of the system 100. For instance, one centralized computer system (e.g., a server computer system) can be configured to provide certain functionality of the platform 150 to multiple different users. To access this functionality, each user can configure her own device (e.g., by installing an application on a mobile device) to interact with the centralized computer system. During use, information is exchanged between the user's device and the centralized computer system to facilitate performance of the tasks described herein.

In some cases, information obtained from one user device can be used to process physical assets for one or more other user devices. For example, in processing a physical asset with respect to a first device, the platform 150 may determine that a particular sender includes particular types of information on particular locations on a physical asset. This information can be used to process additional physical assets by that same sender (e.g., to increase the efficiency and/or accuracy by which physical assets are processed). As another example, information gathered by each of the user devices can be used to train or develop a machine learning model to process physical assets. As another example, information controlling the operation of each of the user devices (e.g., computerized rules) can be stored in a collective database (e.g., a "cloud" database). The information can be updated (e.g., periodically, continuously, etc.), and selectively transmitted to each of the user devices (e.g., to "update" the functionality and operation of the user devices). Accordingly, multiple different users can collectively interact with the centralized computer system to process physical assets in a more effective manner.

Figure 5:
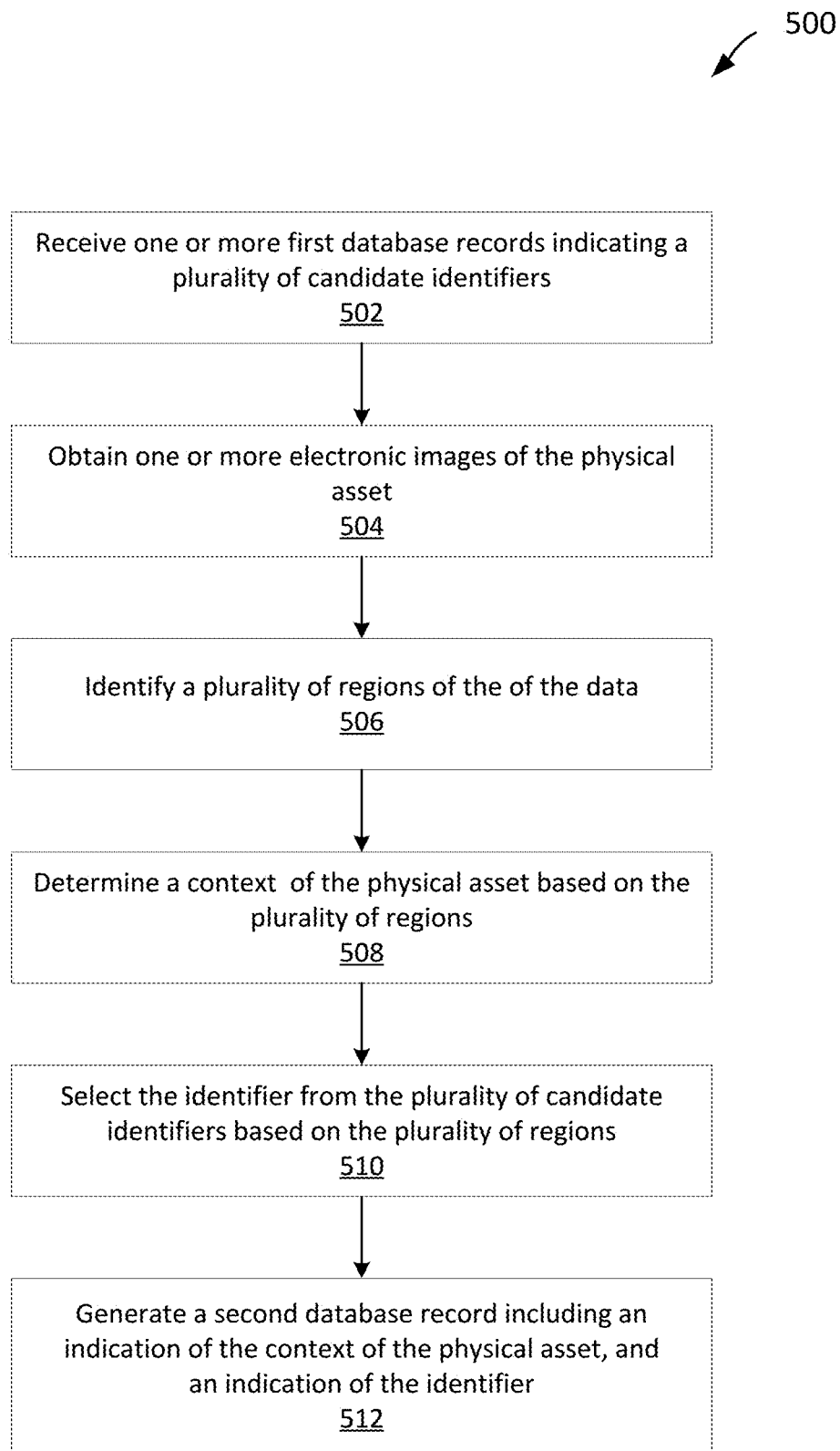
FIG. 5 a flow diagram of an example process for electronically determining an identifier associated with a physical asset.

An example process 500 for electronically determining an identifier associated with a physical asset is shown in FIG. 5. In some implementations, the process 500 can be performed by the system 100 in FIG. 1 and/or the package recognition platform 150 shown in FIGS. 1 and 2.

In the process 500, one or more processes receives one or more first database records indicating a plurality of candidate identifiers (step 502).

The one or more processors obtains one or more electronic images of the physical asset (step 504). At least one electronic image includes a graphical representation of data printed on the physical asset. The one or more electronic images of the physical asset can be obtained by sequentially obtaining electronic images of the physical asset until a stop criterion is satisfied. The stop criterion can correspond to a minimum number of interpretable textual characters of the data depicted in the electronic image. At least one of the electronic images of the package can include a graphical representation of substantially an entirety of the package. In some cases, the one or more processors are provided by a mobile device. The one or more electronic images of the physical asset can be obtained by capturing the one or more electronic images of the physical asset using a camera module provided by the mobile device. Example techniques for obtaining electronic images are described, for example, with respect to FIG. 3A.

The one or more processes identifies a plurality of regions of the data (step 506). The plurality of regions includes one or more of a first region containing graphically encoded data, and a second region containing textual data. The plurality of regions can be identified by determining a spatial template for the data based the first region, and identifying the second region based on the spatial template. The spatial template can indicate one or more spatial locations of one or more regions of the data. The spatial template can be determined by obtaining one or more candidate spatial templates, determining a first entity associated with the physical asset based on the graphically encoded data contained in the first region, and responsive to determining the first entity, selecting the spatial template from the plurality of candidate spatial templates based on the first entity, the spatial template corresponding to the first entity. Further, the spatial template can indicate a spatial location of the second region relative to a spatial location of the first region.

In some cases, the plurality of regions can further include a third region containing one or more of additional graphically encoded data, and a graphical representation of a logo. The first region can include a first machine-readable code, and the third region can include a second machine-readable code.

Example techniques for identifying regions of the data are described, for example, with respect to FIGS. 3B and 3C.

The one or more processors determines a context of the physical asset based on the plurality of regions (step 508). The context of the physical asset can be determined by determining a courier associated with the physical asset based on the plurality of identified regions. In some cases, wherein the context of the physical asset can be determined based on the graphical representation of substantially the entirety the physical asset. In some cases, the context of the physical asset can be determined by determining a semantic description of the physical asset based on the graphical representation of substantially the entirety of the physical asset.

The one or more processors selects the identifier from the plurality of candidate identifiers based on the plurality of regions (step 510). The identifier can be selected by parsing textual data disposed at the spatial location of the second region indicated by the spatial template, and determining a second entity associated with the physical asset based on the identifier. The identifier can also be selected by determining one or more text strings based on the second region, determining a similarity between the one or more text strings and a particular candidate identifier, and selecting that candidate identifier as the identifier.

In some cases, the identifier can include the at least one of a legal name of an intended recipient of the physical asset, an alias of the intended recipient of the physical asset, or a location associated with the intended recipient of the physical asset. The identifier can be selected by determining, for each candidate identifier, a probability that the candidate identifier is associated with the physical asset, and selecting the identifier based on the probabilities. In some cases, for each candidate identifier, the probability that the candidate identifier can be associated with the physical asset is determined based on one or more of a similarity between the textual data and the candidate identifier, a similarity between the candidate identifier and one or more one or more other candidate identifiers, and historical data indicating one or more additional physical assets associated with the candidate identifier.

The one more processors generates a second database record including an indication of the context of the physical asset, and an indication of the identifier (step 512).

Example techniques for determining a context of the physical asset, selecting the identifier, and generating a second database record are described, for example, with respect to FIG. 3D.

In some cases, a notification message can be transmitted to an entity associated with the identifier (e.g., an intended recipient of the physical asset). Example techniques for transmitting a notification message are described, for example, with respect to FIGS. 3E and 3F.

In some cases, an entity associated with the identifier (e.g., an intended recipient of the physical asset), and a location associated with the entity (e.g., an address or sub-address for the intended recipient) can be determined.

Some implementations of subject matter and operations described in this specification can be implemented in digital electronic circuitry, or in computer software, firmware, or hardware, including the structures disclosed in this specification and their structural equivalents, or in combinations of one or more of them. For example, in some implementations, the computer systems 102 and 104*a-d* and the platform 150 can be implemented using digital electronic circuitry, or in computer software, firmware, or hardware, or in combinations of one or more of them. In another example, the process 500 can be implemented using digital electronic circuitry, or in computer software, firmware, or hardware, or in combinations of one or more of them.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD-ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

Figure 6:
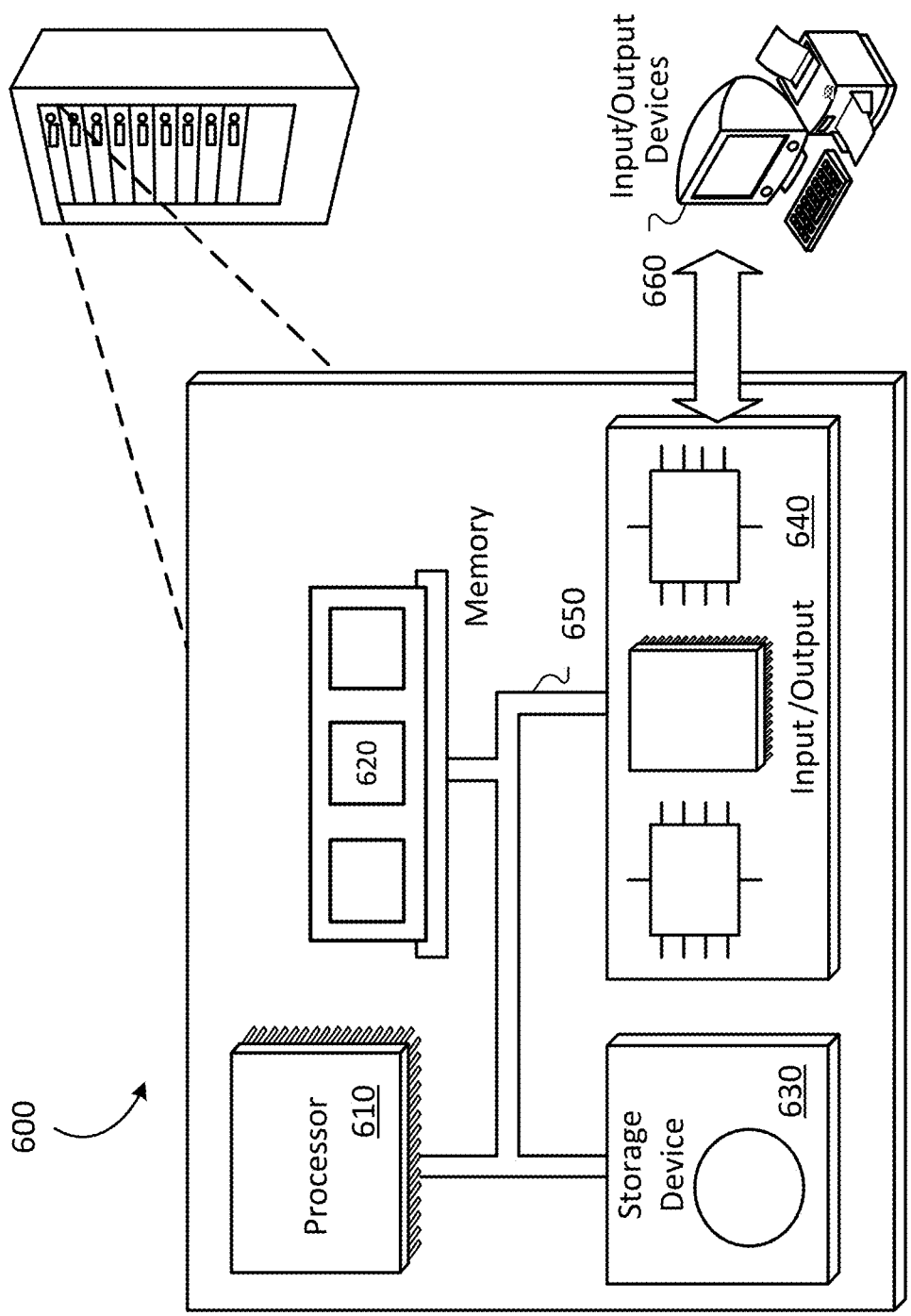
FIG. 6 is a diagram of an example computer system.

FIG. 6 shows an example computer system 600 that includes a processor 610, a memory 620, a storage device 630 and an input/output device 640. Each of the components 610, 620, 630 and 640 can be interconnected, for example, by a system bus 650. The processor 610 is capable of processing instructions for execution within the system 600. In some implementations, the processor 610 is a single-threaded processor, a multi-threaded processor, or another type of processor. The processor 610 is capable of processing instructions stored in the memory 620 or on the storage device 630. The memory 620 and the storage device 630 can store information within the system 600.

The input/output device 640 provides input/output operations for the system 600. In some implementations, the input/output device 640 can include one or more of a network interface device, e.g., an Ethernet card, a serial communication device, e.g., an RS-232 port, and/or a wireless interface device, e.g., an 802.11 card, a 3G wireless modem, a 4G wireless modem, a 5G wireless modem, etc. In some implementations, the input/output device can include driver devices configured to receive input data and send output data to other input/output devices, e.g., keyboard, printer and display devices 660. In some implementations, mobile computing devices, mobile communication devices, and other devices can be used.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of embodiments have been described. Nevertheless, it will be understood that various modifications may be made without departing from the spirit and scope of the invention. Accordingly, other embodiments are within the scope of the following claims.

What is claimed is:

1. A computer-implemented method for electronically determining an identifier associated with a physical asset, the method being executed by one or more processors, and comprising:
    receiving, by the one or more processors, one or more first database records indicating a plurality of candidate identifiers;
    obtaining, by the one or more processors, one or more electronic images of the physical asset, wherein at least one electronic image comprises a graphical representation of data printed on the physical asset;
    identifying, by the one or more processors based on the one or more electronic images, a plurality of regions of the data, the plurality of regions comprising one or more of:
        a first region containing graphically encoded data, and
        a second region containing textual data;
    determining, by the one or more processors, a context of the physical asset based on the plurality of regions;
    selecting, by the one or more processors, the identifier from the plurality of candidate identifiers based on the plurality of regions; and
    generating, by the one more processors, a second database record comprising:
        an indication of the context of the physical asset, and
        an indication of the identifier.

2. The method of claim 1, wherein identifying the plurality of regions comprises:
    determining a spatial template for the data based the first region, the spatial template indicating one or more spatial locations of one or more regions of the data, and identifying the second region based on the spatial template.

3. The method of claim 2, wherein determining the spatial template comprises:
   obtaining one or more candidate spatial templates;
   determining a first entity associated with the physical asset based on the graphically encoded data contained in the first region; and
   responsive to determining the first entity, selecting the spatial template from the plurality of candidate spatial templates based on the first entity, the spatial template corresponding to the first entity.

4. The method of claim 3, wherein the spatial template indicates a spatial location of the second region relative to a spatial location of the first region.

5. The method of claim 4, wherein selecting the identifier comprises parsing textual data disposed at the spatial location of the second region indicated by the spatial template.

6. The method of claim 5, wherein selecting the identifier further comprises determining a second entity associated with the physical asset based on the identifier.

7. The method of claim 1, wherein obtaining the one or more electronic images of the physical asset comprises sequentially obtaining electronic images of the physical asset until a stop criterion is satisfied.

8. The method of claim 7, wherein the stop criterion corresponds to a minimum number of interpretable textual characters of the data depicted in the electronic image.

9. The method of claim 1, wherein the plurality of regions further comprises a third region containing one or more of:
   additional graphically encoded data, and
   a graphical representation of a logo.

10. The method of claim 9, wherein the first region comprises a first machine-readable code, and the third region comprises a second machine-readable code.

11. The method of claim 1, wherein determining the context of the physical asset comprises determining a courier associated with the physical asset based on the plurality of identified regions.

12. The method of claim 1, wherein selecting the identifier comprises:
   determining one or more text strings based on the second region;
   determining a similarity between the one or more text strings and a particular candidate identifier; and
   selecting that candidate identifier as the identifier.

13. The method of claim 12, wherein the identifier comprises at least one of a legal name of an intended recipient of the physical asset, an alias of the intended recipient of the physical asset, or a location associated with the intended recipient of the physical asset.

14. The method of claim 1, wherein selecting the identifier comprises:
   determining, for each candidate identifier, a probability that the candidate identifier is associated with the physical asset; and
   selecting the identifier based on the probabilities.

15. The method of claim 14, wherein, for each candidate identifier, the probability that the candidate identifier is associated with the physical asset is determined based on one or more of:
   a similarity between the textual data and the candidate identifier,
   a similarity between the candidate identifier and one or more one or more other candidate identifiers, and
   historical data indicating one or more additional physical assets associated with the candidate identifier.

16. The method of claim 1, wherein at least one of the electronic images of the package comprises a graphical representation of substantially an entirety of the package, and
   wherein the context of the physical asset is determined further based on the graphical representation of substantially the entirety the physical asset.

17. The method of claim 16, wherein determining the context of the physical asset comprises determining a semantic description of the physical asset based on the graphical representation of substantially the entirety of the physical asset.

18. The method of claim 1, wherein the one or more processors are provided by a mobile device, and
   wherein obtaining the one or more electronic images of the physical asset comprises capturing the one or more electronic images of the physical asset using a camera module provided by the mobile device.

19. The method of claim 1, further comprising transmitting a notification message to an entity associated with the identifier.

20. The method of claim 1, further comprising determining an entity associated with the identifier, and a location associated with the entity.

21. A non-transitory computer-readable medium including one or more sequences of instructions which, when executed by one or more processors, causes:
   receiving, by the one or more processors, one or more first database records indicating a plurality of candidate identifiers;
   obtaining, by the one or more processors, one or more electronic images of the physical asset, wherein at least one electronic image comprises a graphical representation of data printed on the physical asset;
   identifying, by the one or more processors based on the one or more electronic images, a plurality of regions of the data, the plurality of regions comprising one or more of:
      a first region containing graphically encoded data, and
      a second region containing textual data;
   determining, by the one or more processors, a context of the physical asset based on the plurality of regions;
   selecting, by the one or more processors, the identifier from the plurality of candidate identifiers based on the plurality of regions; and
   generating, by the one more processors, a second database record comprising:
      an indication of the context of the physical asset, and
      an indication of the identifier.

22. The non-transitory computer-readable medium of claim 21, wherein identifying the plurality of regions comprises:
   determining a spatial template for the data based the first region, the spatial template indicating one or more spatial locations of one or more regions of the data, and
   identifying the second region based on the spatial template.

23. The non-transitory computer-readable medium of claim 22, wherein determining the spatial template comprises:
   obtaining one or more candidate spatial templates;
   determining a first entity associated with the physical asset based on the graphically encoded data contained in the first region; and
   responsive to determining the first entity, selecting the spatial template from the plurality of candidate spatial templates based on the first entity, the spatial template corresponding to the first entity.

24. The non-transitory computer-readable medium of claim 23, wherein the spatial template indicates a spatial location of the second region relative to a spatial location of the first region.

25. The non-transitory computer-readable medium of claim 24, wherein selecting the identifier comprises parsing textual data disposed at the spatial location of the second region indicated by the spatial template.

26. The non-transitory computer-readable medium of claim 25, wherein selecting the identifier further comprises determining a second entity associated with the physical asset based on the identifier.

27. The non-transitory computer-readable medium of claim 21, wherein obtaining the one or more electronic images of the physical asset comprises sequentially obtaining electronic images of the physical asset until a stop criterion is satisfied.

28. The non-transitory computer-readable medium of claim 27, wherein the stop criterion corresponds to a minimum number of interpretable textual characters of the data depicted in the electronic image.

29. The non-transitory computer-readable medium of claim 21, wherein the plurality of regions further comprises a third region containing one or more of:
additional graphically encoded data, and
a graphical representation of a logo.

30. The non-transitory computer-readable medium of claim 29, wherein the first region comprises a first machine-readable code, and the third region comprises a second machine-readable code.

31. The non-transitory computer-readable medium of claim 21, wherein determining the context of the physical asset comprises determining a courier associated with the physical asset based on the plurality of identified regions.

32. The non-transitory computer-readable medium of claim 21, wherein selecting the identifier comprises:
determining one or more text strings based on the second region;
determining a similarity between the one or more text strings and a particular candidate identifier; and
selecting that candidate identifier as the identifier.

33. The non-transitory computer-readable medium of claim 32, wherein the identifier comprises at least one of a legal name of an intended recipient of the physical asset, an alias of the intended recipient of the physical asset, or a location associated with the intended recipient of the physical asset.

34. The non-transitory computer-readable medium of claim 21, wherein selecting the identifier comprises:
determining, for each candidate identifier, a probability that the candidate identifier is associated with the physical asset; and
selecting the identifier based on the probabilities.

35. The non-transitory computer-readable medium of claim 34, wherein, for each candidate identifier, the probability that the candidate identifier is associated with the physical asset is determined based on one or more of:
a similarity between the textual data and the candidate identifier,
a similarity between the candidate identifier and one or more one or more other candidate identifiers, and
historical data indicating one or more additional physical assets associated with the candidate identifier.

36. The non-transitory computer-readable medium of claim 21, wherein at least one of the electronic images of the package comprises a graphical representation of substantially an entirety of the package, and
wherein the context of the physical asset is determined further based on the graphical representation of substantially the entirety the physical asset.

37. The non-transitory computer-readable medium of claim 36, wherein determining the context of the physical asset comprises determining a semantic description of the physical asset based on the graphical representation of substantially the entirety of the physical asset.

38. The non-transitory computer-readable medium of claim 21, wherein the one or more processors are provided by a mobile device, and
wherein obtaining the one or more electronic images of the physical asset comprises capturing the one or more electronic images of the physical asset using a camera module provided by the mobile device.

39. The non-transitory computer-readable medium of claim 21, wherein the one or more sequences of instructions, when executed by one or more processors, further causes transmitting a notification message to an entity associated with the identifier.

40. The non-transitory computer-readable medium of claim 21, wherein the one or more sequences of instructions, when executed by one or more processors, further causes determining an entity associated with the identifier, and a location associated with the entity.

41. A system comprising:
one or more processors; and
one or more non-transitory computer-readable media including one or more sequences of instructions which, when executed by the one or more processors, causes:
non-transitory computer-readable medium including one or more sequences of instructions which, when executed by one or more processors, causes:
receiving, by the one or more processors, one or more first database records indicating a plurality of candidate identifiers;
obtaining, by the one or more processors, one or more electronic images of the physical asset, wherein at least one electronic image comprises a graphical representation of data printed on the physical asset;
identifying, by the one or more processors based on the one or more electronic images, a plurality of regions of the data, the plurality of regions comprising one or more of:
a first region containing graphically encoded data, and
a second region containing textual data;
determining, by the one or more processors, a context of the physical asset based on the plurality of regions;
selecting, by the one or more processors, the identifier from the plurality of candidate identifiers based on the plurality of regions; and
generating, by the one more processors, a second database record comprising:
an indication of the context of the physical asset, and
an indication of the identifier.

42. The system of claim 41, wherein identifying the plurality of regions comprises:
determining a spatial template for the data based the first region, the spatial template indicating one or more spatial locations of one or more regions of the data, and
identifying the second region based on the spatial template.

43. The system of claim 42, wherein determining the spatial template comprises:
obtaining one or more candidate spatial templates;

determining a first entity associated with the physical asset based on the graphically encoded data contained in the first region; and responsive to determining the first entity, selecting the spatial template from the plurality of candidate spatial templates based on the first entity, the spatial template corresponding to the first entity.

44. The system of claim 43, wherein the spatial template indicates a spatial location of the second region relative to a spatial location of the first region.

45. The system of claim 44, wherein selecting the identifier comprises parsing textual data disposed at the spatial location of the second region indicated by the spatial template.

46. The system of claim 45, wherein selecting the identifier further comprises determining a second entity associated with the physical asset based on the identifier.

47. The system of claim 41, wherein obtaining the one or more electronic images of the physical asset comprises sequentially obtaining electronic images of the physical asset until a stop criterion is satisfied.

48. The system of claim 47, wherein the stop criterion corresponds to a minimum number of interpretable textual characters of the data depicted in the electronic image.

49. The system of claim 41, wherein the plurality of regions further comprises a third region containing one or more of:
additional graphically encoded data, and
a graphical representation of a logo.

50. The system of claim 49, wherein the first region comprises a first machine-readable code, and the third region comprises a second machine-readable code.

51. The system of claim 41, wherein determining the context of the physical asset comprises determining a courier associated with the physical asset based on the plurality of identified regions.

52. The system of claim 41, wherein selecting the identifier comprises:
determining one or more text strings based on the second region;
determining a similarity between the one or more text strings and a particular candidate identifier; and
selecting that candidate identifier as the identifier.

53. The system of claim 52, wherein the identifier comprises at least one of a legal name of an intended recipient of the physical asset, an alias of the intended recipient of the physical asset, or a location associated with the intended recipient of the physical asset.

54. The system of claim 41, wherein selecting the identifier comprises:
determining, for each candidate identifier, a probability that the candidate identifier is associated with the physical asset; and
selecting the identifier based on the probabilities.

55. The system of claim 54, wherein, for each candidate identifier, the probability that the candidate identifier is associated with the physical asset is determined based on one or more of:
a similarity between the textual data and the candidate identifier,
a similarity between the candidate identifier and one or more one or more other candidate identifiers, and
historical data indicating one or more additional physical assets associated with the candidate identifier.

56. The system of claim 41, wherein at least one of the electronic images of the package comprises a graphical representation of substantially an entirety of the package, and
wherein the context of the physical asset is determined further based on the graphical representation of substantially the entirety the physical asset.

57. The system of claim 56, wherein determining the context of the physical asset comprises determining a semantic description of the physical asset based on the graphical representation of substantially the entirety of the physical asset.

58. The system of claim 41, wherein the one or more processors are provided by a mobile device, and
wherein obtaining the one or more electronic images of the physical asset comprises capturing the one or more electronic images of the physical asset using a camera module provided by the mobile device.

59. The system of claim 41, wherein the one or more sequences of instructions, when executed by one or more processors, further causes transmitting a notification message to an entity associated with the identifier.

60. The system of claim 41, wherein the one or more sequences of instructions, when executed by one or more processors, further causes determining an entity associated with the identifier, and a location associated with the entity.

* * * * *